US012027314B2

United States Patent
Bozkurt et al.

(10) Patent No.: US 12,027,314 B2
(45) Date of Patent: Jul. 2, 2024

(54) FLEXIBLE ENERGY STORAGE DEVICE BASED ON GYLCEROL GEL ELECTROLYTE

(71) Applicant: Imam Abdulrahman Bin Faisal University, Dammam (SA)

(72) Inventors: Ayhan Bozkurt, Dammam (SA); Emre Cevik, Dammam (SA); Seyda Tugba Günday Anil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 728 days.

(21) Appl. No.: 17/226,862

(22) Filed: Apr. 9, 2021

(65) Prior Publication Data
US 2022/0328257 A1 Oct. 13, 2022

(51) Int. Cl.
*H01G 11/56* (2013.01)
*H01G 11/02* (2013.01)
(Continued)

(52) U.S. Cl.
CPC ............ *H01G 11/56* (2013.01); *H01G 11/02* (2013.01); *H01G 11/26* (2013.01); *H01G 11/38* (2013.01);
(Continued)

(58) Field of Classification Search
CPC ........ H01G 11/56; H01G 11/02; H01G 11/26; H01G 11/38; H01G 11/46; H01G 11/86;
(Continued)

(56) References Cited

U.S. PATENT DOCUMENTS

| | | | |
|---|---|---|---|
| 5,332,530 A | * | 7/1994 | Eid .......................... C09K 9/00 429/188 |
| 9,875,854 B2 | | 1/2018 | Lim et al. |
| 10,655,024 B2 | | 5/2020 | Yadavalli et al. |

FOREIGN PATENT DOCUMENTS

| | | |
|---|---|---|
| CN | 105461968 B | 1/2018 |
| CN | 110904489 A | 3/2020 |

OTHER PUBLICATIONS

Peng, et al. ; High-performance and flexible solid-state supercapacitors basedon high toughness and thermoplastic poly(vinylalcohol)/ NaCl/glycerol supramolecular gel polymer electrolyte ; Electrochimica Acta, vol. 324 ; Nov. 20, 2019 ; 2 Pages ; Abstract Only.

(Continued)

*Primary Examiner* — Matthew E. Hoban
*Assistant Examiner* — Lynne Edmondson
(74) *Attorney, Agent, or Firm* — Oblon, McClelland, Maier & Neustadt, L.L.P.

(57) ABSTRACT

A flexible energy storage device with a glycerol-based gel electrolyte is provided. The flexible energy storage device can include a pair of electrodes separated by the gel electrolyte. The electrolytes can be in gel form, bendable and stretchable in a device. The gel electrolyte can include glycerol, redox-active molybdenum-containing ions, and a secondary ionic substance. The secondary ionic substance can include a salt. The gel electrolyte can have a density of 1.4 to 1.9 g/cm$^3$ and an ionic conductivity of $2.3\times10^{-4}$ to $3.2\times10^{-4}$ Scm$^{-1}$. The flexible energy storage device may retain greater than 95% of an unbent energy storage capacity when bent at an angle of 10 to 170°.

19 Claims, 33 Drawing Sheets

(51) Int. Cl.
  *H01G 11/26* (2013.01)
  *H01G 11/38* (2013.01)
  *H01G 11/46* (2013.01)
  *H01G 11/86* (2013.01)
  *H01M 6/18* (2006.01)
  *H01M 8/1016* (2016.01)
  *H01M 8/18* (2006.01)
  *H01M 10/0565* (2010.01)

(52) U.S. Cl.
  CPC ............ *H01G 11/46* (2013.01); *H01G 11/86* (2013.01); *H01M 6/187* (2013.01); *H01M 8/1016* (2013.01); *H01M 8/188* (2013.01)

(58) Field of Classification Search
  CPC .... H01M 6/187; H01M 8/1016; H01M 8/188; H01M 10/0525; H01M 10/0565; H01M 50/36; H01M 2300/0085
  See application file for complete search history.

(56) References Cited

OTHER PUBLICATIONS

Brza, et al. ; Energy Storage Behavior of Lithium-Ion Conducting poly(vinyl alcohol) (PVA): Chitosan(CS)-Based Polymer Blend Electrolyte Membranes: Preparation, Equivalent Circuit Modeling, Ion Transport Parameters, and Dielectric Properties ; Membranes 10, 381 ; Nov. 30, 2020 ; 20 Pages.

Marcondes ; Amylopectin-rich starch plasticized with glycerol for polymer electrolyte application ; Solid State Ionics 181 ; pp. 586-591 ; Mar. 17, 2010 ; 6 Pages.

\* cited by examiner

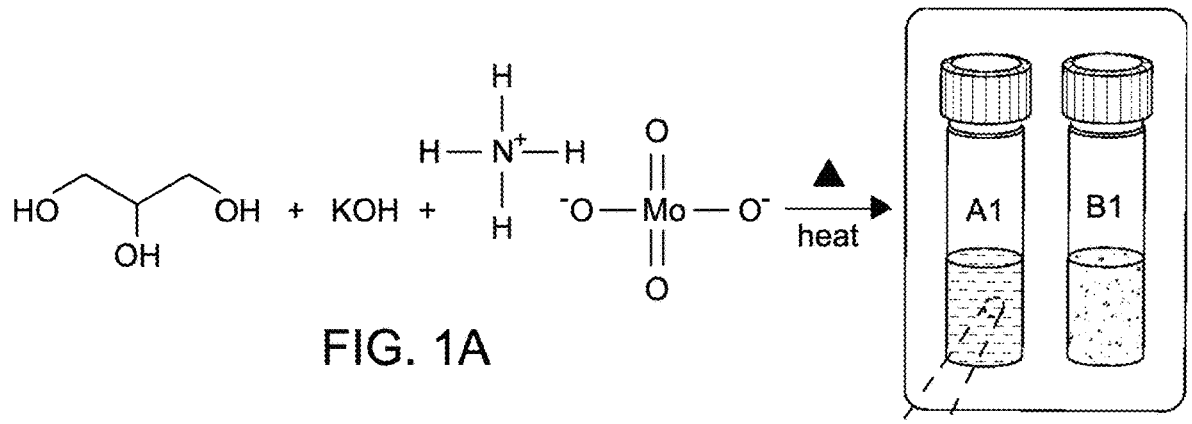
FIG. 1A
FIG. 1B
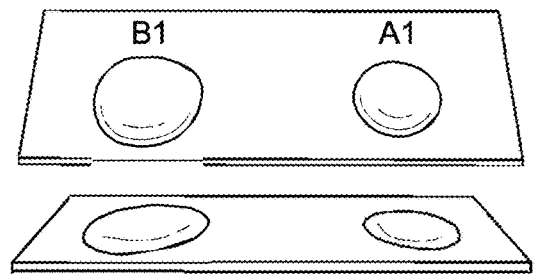
A1: Glycerol+KOH+Mo
B1: Glycerol
FIG. 1C
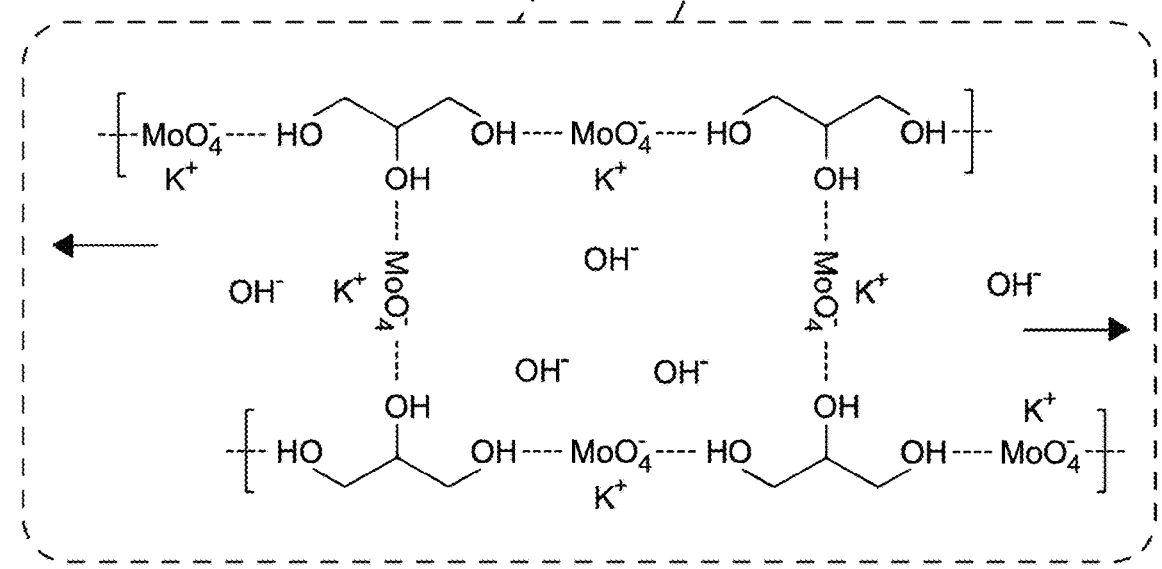
FIG. 1D

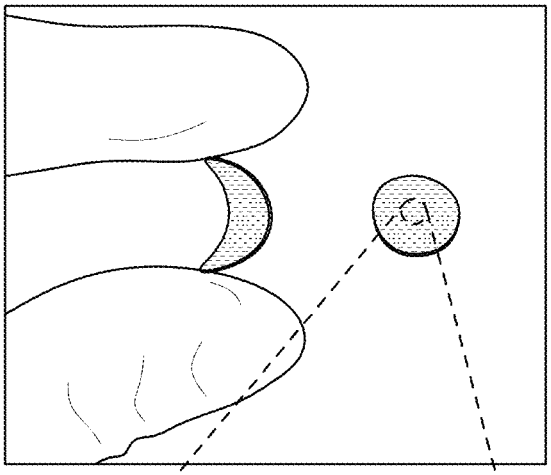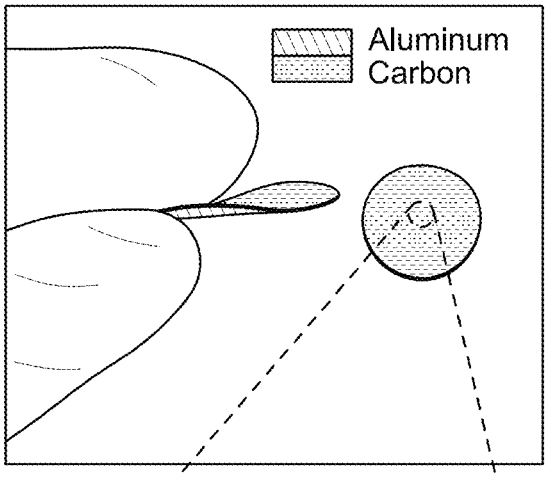
FIG. 2C  FIG. 2D
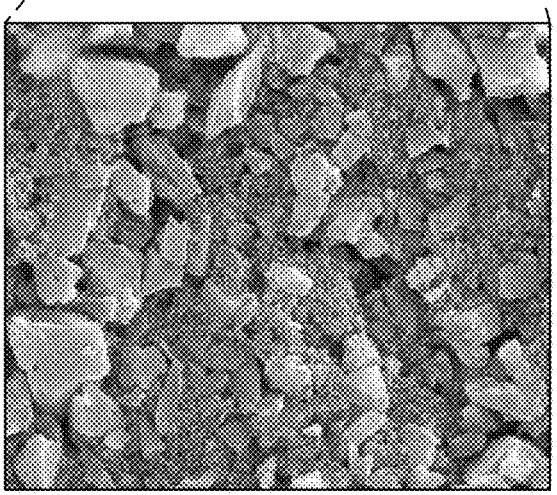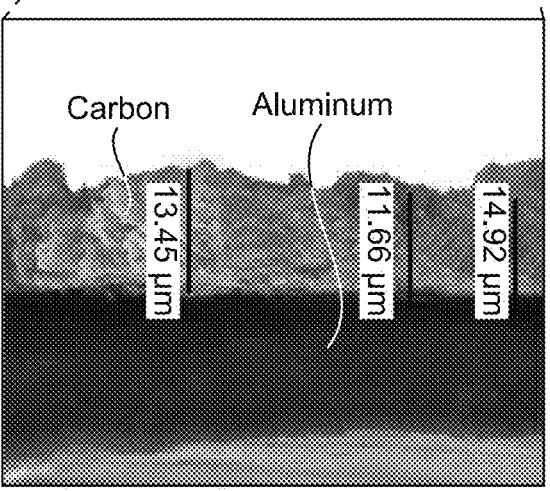
FIG. 2E  FIG. 2F

FLEXIBLE ENERGY STORAGE DEVICE BASED ON GYLCEROL GEL ELECTROLYTE

BACKGROUND OF THE INVENTION

Field of the Invention

The present disclosure relates to a flexible energy storage device. More specifically, the present disclosure relates to supercapacitors including electrodes and a glycerol-based bio-electrolyte. The glycerol gel electrolyte contains a redox-active molybdenum-containing ion and a salt.

Discussion of the Background

A considerable improvement has been seen in cycle stabilities and energy densities of energy storage systems during the last few decades. Among these systems, supercapacitors tend to have exceptional features such as long cycle life, fast charge/discharge, high power density, and environmental compatibility. Most supercapacitors use a liquid electrolyte to migrate the ions inside the system. However, the liquid electrolytes create several difficulties that include high weight, arduousness in integration, and possible electrolyte leakage that necessitates safe encapsulation, resulting in high cost. To meet the growing demand for flexible and portable electronic devices, gel electrolytes as alternatives to liquid electrolytes have been approached.

A polymeric gel is widely used as a gel electrolyte in supercapacitors having electrolyte networks that are filled with ionic liquid (IL). The supercapacitors are superior with respect to system integration compared to solid polymer electrolytes and liquid electrolytes. Such polymer/IL blends show high mechanical performance and are safe during fabrication. However, there are several drawbacks associated with fabrication of such blends, such as high production costs, adverse environmental effects, and detrimental toxicological impact of chemicals used. Hence, there is a need for an eco-friendly, high capacitance, low-cost electrolyte. Improved electrolytes will aid in fabrication of capacitors especially flexible capacitors and methods of preparation of such flexible capacitors. Such capacitors may exhibit high capacitance and high temperature tolerance and also be eco-friendly, cost effective.

SUMMARY OF THE INVENTION

Aspects of the invention provide a flexible energy storage device, comprising: a pair of electrodes separated by a gel electrolyte, the gel electrolyte comprising glycerol, redox-active molybdenum-containing ions, and a secondary ionic substance, wherein the flexible energy storage device retains greater than 95% of an unbent energy storage capacity when bent at an angle of 10 to 170°. The gel electrolytes can be modified by any permutation of the features described herein, particularly the following.

The glycerol may be present in an amount of 40 to 98 wt. %, based on a total weight of the gel electrolyte. The redox-active molybdenum-containing ions may be present in an amount of 1 to 25 wt. %, based on a total weight of gel electrolyte. Further, the secondary ionic substance may be present in an amount of 1 to 35 wt. %, based on a total weight of gel electrolyte. Such secondary ionic substance may include a salt, for example, a hydroxide salt, a halide salt, a sulfate salt, a nitrate salt, a perchlorate salt, a tetrafluoroborate salt, a difluoro(oxalato)borate salt, a hexafluorophosphate salt, and a bis(trifluoromethanesulfonyl)imide salt. The secondary ionic substance may be an alkali metal hydroxide, such as, potassium hydroxide.

The flexible storage device may contain the gel electrolyte substantially free of water and polymer additives. The gel electrolyte may have a density of 1.4 to 1.9 g/cm$^3$ and an ionic conductivity of $2.3 \times 10^{-4}$ to $3.2 \times 10^{-4}$ Scm$^{-1}$. The flexible storage device may have one or both of the electrodes as carbon electrodes.

Aspects of the invention provide a flexible energy storage device, which may be a supercapacitor, a fuel cell, or a battery. Such that the supercapacitor may have a specific capacitance of 275 to 350 F/g and may have an energy density of 40 to 50 Wh/kg.

Aspects of the invention include a method of forming the flexible energy storage device, the method comprises: mixing the secondary ionic substance and the glycerol at 25 to 75° C. to produce an ion-containing mixture; adding to the ion-containing mixture a salt comprising the redox-active molybdenum-containing ions to form an uncured gel; vacuum-drying the uncured gel to form the gel electrolyte; disposing the gel electrolyte on a first electrode such that the gel electrolyte forms a uniform film covering an entirety of a top surface of the first electrode; and placing onto the gel electrolyte a second electrode such that the second electrode is separated from the first electrode by the gel electrolyte to form the flexible energy storage device. Such method may include a combination wherein one or both of the electrodes are carbon electrodes prepared by uniformly depositing on a conductive electrode support a film comprising activated carbon, conductive carbon, and a binder such that an entirety of a top surface of the conductive electrode support is individually covered by the film to form a carbon electrode.

Aspects of the invention provide a gel electrolyte; the gel electrolyte comprises: 40 to 98 wt. % glycerol; 1 to 25 wt. % redox-active molybdenum-containing ions; and 1 to 35 wt. % of a secondary ionic substance, wherein the gel electrolyte is substantially free of water. Such a gel electrolyte may have a density of 1.4 to 1.9 g/cm$^3$ and an ionic conductivity of $2.3 \times 10^{-4}$ to $3.2 \times 10^{-4}$ Scm$^{-1}$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A shows a representation of the preparation and structure of the anhydrous bio-inspired electrolyte;

FIG. 1B shows a representation of glycerol with and without KOH—Mo;

FIG. 1C shows a representation of electrolyte spreading along a surface glass substrate;

FIG. 1D shows complexation and ion diffusion model of Gly-KOH—Mo;

FIG. 2C shows digital photograph showing flexibility of CC-coated disk electrode;

FIG. 2D shows digital photograph and SEM image of cross-sectional views of CC-coated aluminum;

FIG. 2E shows scanning electron microscope (SEM) image of cross-sectional views of CC-coated aluminum;

FIG. 2F shows SEM image of cross-sectional views of CC-coated aluminum;

DETAILED DESCRIPTION OF THE INVENTION

Figure 1E:
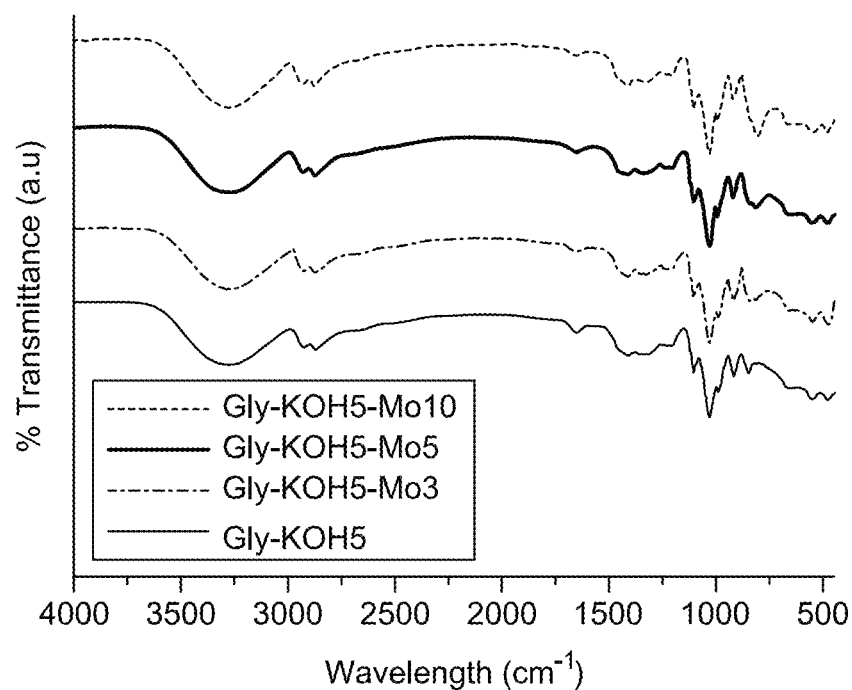
FIG. 1E shows Fourier-transform infrared spectroscopy (FT-IR) spectrum of the electrolytes at various doping ratios.

As used herein, the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

The present disclosure is intended to include all hydration states of a given compound or formula, unless otherwise noted or when heating a material. For example, magnesium nitrate, $Mg(NO_3)_2$, includes anhydrous $Mg(NO_3)_2$, $Mg(NO_3)_2·6H_2O$, and any other hydrated forms or mixtures.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of oxygen include 16O, 17O, and 18O. Isotopes of molybdenum include $^{92}$Mo, $^{94}$Mo, $^{95}$Mo, $^{96}$Mo, $^{97}$Mo, $^{98}$Mo, and $^{100}$Mo. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, even more preferably less than about 0.01 wt %, even more preferably less than about 0.001 wt %, yet even more preferably 0 wt. %, relative to a total weight of the composition being discussed.

According to a first aspect, the present disclosure relates to a flexible energy storage device. The flexible energy storage device comprises a pair of electrodes separated by a gel electrolyte. The gel electrolyte comprises glycerol, redox-active molybdenum-containing ions, and a secondary ionic substance.

In some embodiments, the glycerol is present in an amount of 40 to 98 wt %, preferably 42.5 to 97.5 wt %, preferably 45 to 95 wt %, preferably 50 to 90 wt %, preferably 52.5 to 85 wt %, preferably 55 to 82.5 wt %, preferably 57.5 to 80 wt %, preferably 60 to 77.5 wt %, preferably 65 to 75 wt %, preferably 67.5 to 72.5 wt % preferably 69 to 70 wt %, based on a total weight of gel electrolyte weight. In some embodiments, the glycerol is pure glycerol. In alternative embodiments, the glycerol is a solution comprising glycerol in water. In such embodiments, the glycerol may be present in the solution in an amount of 1 to 80 wt %, based on a total weight of solution.

In some embodiments, the redox-active molybdenum-containing ions are present in an amount of 1 to 25 wt %, preferably 2 to 22.5 wt %, preferably 3 to 20 wt %, preferably 4 to 17.5 wt %, preferably 5 to 15 wt %, preferably 6 to 12.5 wt %, preferably 7 to 10 wt %, preferably 7.5 to 9 wt %, preferably 8 to 8.5 wt %, based on a total weight of gel electrolyte. The redox-active molybdenum-containing ions may contain molybdenum in the +2 oxidation state, the +3 oxidation state, the +4 oxidation state, the +5 oxidation state, the +6 oxidation state, or any combination thereof.

In some embodiments, the redox-active molybdenum-containing ions are monoatomic molybdenum ions. Such monoatomic molybdenum ions are preferably coordinated by at least one glycerol molecule, preferably at least two glycerol molecules, preferably at least three glycerol molecules. These glycerol molecules may be present in the inner coordination sphere of the molybdenum ion. The glycerol molecules coordinated to the monoatomic molybdenum ions may be monodentate or bidentate, but preferably not tridentate. The glycerol molecules may be coordinated to the monoatomic molybdenum ions in protonated form as alcohol ligands or in deprotonated form as alkoxide ligands. In general, the rest of the inner coordination sphere of the monoatomic molybdenum ion may be filled by any suitable ligand known to one of ordinary skill in the art. Examples of suitable ligands include species with oxygen-containing functional groups such as non-glycerol alcohols, alkoxides, hydroxides, carboxylic acids and carboxylates, esters, and ethers; species with nitrogen-containing functional groups such as amines (understood here to include ammonia), amides, azides, diimides (also known as azo compounds), imines, porphyrins, imides, isonitriles, nitriles, and nitro compounds; species with phosphorous-containing functional groups such as phosphines, phosphites, phosphates, phosphonites, phosphonates, phosphinites, and phosphinates; species with sulfur-containing functional groups such as thiols, thiolates, disulfides, sulfones, sulfonic acids and sulfonates, sulfoxides, thials, thioesters, thiosulfinates, thiocarboxylic acids and thiocarboxylates, sulfinic acids and sulfinates, thiocyanates, and isothiocyanates; hydrocarbons containing one or more π-electron systems such as mesitylene, cyclopentadienyl anion, and cyclooctadecene; halides; and water. In general, the ligands, may be monodentate, bidentate, tridentate, tetradentate, or pentadentate as appropriate. Hexadentate ligands, however, such as ethylenediamine tetraacetic acid (EDTA) are not suitable as such ligands do not leave an open coordination site for coordination of a glycerol molecule. In general, the functional groups may occupy any suitable location on a molecule with acts as a ligand. For example, alcohols or amines may be primary alcohols or amines, secondary alcohols or amines, or tertiary alcohols or amines as appropriate.

In some embodiments, the redox-active molybdenum-containing ions are polyatomic molybdenum-containing ions. Examples of polyatomic molybdenum-containing ions include, but are not limited to molybdate ($MoO_4^{2-}$), dimolybdate ($Mo_2O_7^{2-}$), trimolybdate ($Mo_3O_{13}^{2-}$), tetramolybdate ($Mo_4O_{13}^{2-}$), pentamolybdate ($Mo_5O_{16}^{2-}$), hexamolybdate ($Mo_6O_{19}^{2-}$), heptamolybdate ($Mo_7O_{24}^{6-}$, also known as paramolybdate), octamolybdate ($Mo_8O_{26}^{4-}$), and tetrathiomolybdate ($MoS_4^{2-}$). Additionally, the molybdate may be a heteropolymolybdate such as phosphomolybdate, 6-molybdocolbaltate, or 6-molybdoaluminate. Such polyatomic molybdenum-containing ions may interact with or be associated with at least one, preferably at least two, preferably at least three glycerol molecules in the gel. Such interaction may be through electrostatic interactions. Such interaction may take place in the outer coordination sphere of the polyatomic ion. In preferred embodiments, the redox-active molybdenum-containing ions are molybdate ($MoO_4^{2-}$) ions.

In some embodiments, the secondary ionic substance present in an amount of 1 to 35 wt. %, preferably 5 to 32.5 wt %, preferably 7.5 to 30 wt %, preferably 10 to 29 wt %, preferably 12.5 to 28 wt %, preferably 15 to 27 wt %, preferably 17.5 to 25 wt %, preferably 20 to 24 wt %, preferably 21 to 23 wt %, preferably 22 to 22.5 wt %, based on a total weight of gel electrolyte. In general, the secondary ionic substance may be any suitable ionic substance known to one of ordinary skill in the art. In some embodiments, the secondary ionic substance is at least one selected from the group consisting of a hydroxide salt, a halide salt, a sulfate salt, a nitrate salt, a perchlorate salt, a tetrafluoroborate salt, a difluoro(oxalato)borate salt, a hexafluorophosphate salt, and a bis(trifluoromethanesulfonyl)imide salt. The cation of the secondary ionic substance may be any suitable cation known to one of ordinary skill in the art. Examples of such suitable cations include, but are not limited to alkali metals such as lithium, sodium, and potassium; alkaline earth metals such as calcium, strontium, and barium; transition metals such as copper, zinc, and nickel; and ammonium.

In preferred embodiments, the secondary ionic substance is a hydroxide salt. In preferred embodiments, the hydroxide salt is an alkali metal hydroxide. In preferred embodiments, the secondary ionic substance is potassium hydroxide. In alternative preferred embodiments, the secondary ionic substance is sodium hydroxide. In alternative preferred embodiments, the secondary ionic substance is a mixture of sodium hydroxide and potassium hydroxide.

In some embodiments, the gel electrolyte is substantially free of water. In some embodiments, the gel electrolyte is devoid of water. Such water may be present in the gel itself as a separate component or as part of the glycerol component. In embodiments where the glycerol is a solution comprising glycerol in water, water is present as part of the solution. When water is present within the gel as a swelling agent or as a dispersion medium, the gel may be referred to as a "hydrogel". In preferred embodiments, the gel electrolyte is substantially free of polymer additives. In this context, a polymer additive refers to a polymer added to a dispersion medium or swelling agent to form a gel. Examples of such polymer additives include, but are not limited to polyvinyl alcohol, polyethylene glycol, polyvinyl acetate, polypropylene glycol, polyacrylate, starch, chitosan, collagen, gelatin, fibrin, cellulose, agarose, and alginate. In preferred embodiments, the gel electrolyte is not a hydrogel.

In some embodiments, the flexible energy storage device may retain greater than 75%, preferably greater than 77.5%, preferably greater than 80%, preferably greater than 82.5%, preferably greater than 85%, preferably greater than 87.5%, preferably greater than 90%, preferably greater than 92.5%, preferably greater than 95%, preferably greater than 97.5% of an unbent energy storage capacity when bent at an angle of 10 to 170°, preferably 12.5 to 167.5°, preferably 15 to 165°, preferably 17.5 to 162.5°, preferably 20 to 160°, preferably 22.5 to 157.5°, preferably 25 to 155°, preferably 27.5 to 152.5°, preferably 30 to 1500.

In some embodiments, the gel electrolyte has a density of 1.4 to 1.9 7 g/cm$^3$, preferably 1.45 to 1.85, preferably 1.5 to 1.8, preferably 1.55 to 1.75, preferably 1.6 to 1.7 g/cm$^3$. In some embodiments, the gel electrolyte has an ionic conductivity of $2.3 \times 10^{-4}$ to $3.2 \times 10^{-4}$ Scm$^{-1}$, preferably $2.4 \times 10^{-4}$ to $3.1 \times 10^{-4}$, preferably $2.5 \times 10^{-4}$ to $3.0 \times 10^{-4}$, preferably $2.6 \times 10^{-4}$ to $2.9 \times 10^{-4}$ Scm$^{-1}$.

In general, the flexible energy device may be any suitable energy storage device known to one of ordinary skill in the art. Examples of energy storage devices include a supercapacitor, a fuel cell, and a battery. In some embodiments, the flexible energy storage device is a supercapacitor. In some embodiments, the supercapacitor has a specific capacitance of 275 to 350 F/g, preferably 280 to 345, preferably 285 to 340, preferably 290 to 335, preferably 295 to 330, preferably 300 to 325, preferably 305 to 320, preferably 310 to 315 F/g. In some embodiments, the supercapacitor has an energy density of 40 to 50 Wh/kg, preferably 41 to 49, preferably 42 to 48, preferably 43 to 47, preferably 44 to 46 Wh/kg.

The supercapacitor comprises a pair of electrodes separated by the gel electrolyte described. Such a combination may be referred to as a cell. Based on this terminology, the supercapacitor comprises a minimum of one cell. In some embodiments, the supercapacitor comprises one cell. In alternative embodiments, the supercapacitor comprises more than one cell, for example two cells, three cells, four cells, five cells, six cells, seven cells, eight cells, nine cells, ten cells, or more. The cells may be connected in series, parallel, or a combination of cells connected in series and in parallel.

In general, the electrodes may be any suitable electrodes known to one of ordinary skill in the art. In preferred embodiments, the electrodes are carbon electrodes. In some embodiments, the carbon electrodes comprise conductive carbon. In general, the conductive carbon may be any suitable conductive carbon known to one of ordinary skill in the art. In some embodiments, the conductive carbon has a mean primary particle size of 25 to 75 nm, preferably 30 to 70 nm, preferably 35 to 65 nm, preferably 40 to 60 nm. In some embodiments, the conductive carbon has a BET nitrogen surface area of 50 to 75 m$^2$/g, preferably 55 to 70 m$^2$/g, preferably 60 to 65 m$^2$/g, preferably 61 to 63 m$^2$/g. In some embodiments, the conductive carbon has a density of about 150 to 170 kg/m$^3$, preferably about 152.5 to 167.5 kg/m$^3$, preferably about 155 to 165 kg/m$^3$, preferably about 157.5 to 162.5 kg/m$^3$, preferably about 160 kg/m$^3$. In some embodiments, the conductive carbon is present in an amount of 1 to 20 wt %, preferably 2 to 18 wt %, preferably 3 to 17 wt %, preferably 4 to 16 wt %, preferably 5 to 15 wt %, preferably 6 to 14 wt %, preferably 7 to 13 wt %, preferably 8 to 12 wt %, preferably 9 to 11 wt %, preferably 10 wt %, based on a total weight of the carbon electrode.

In some embodiments, the carbon electrodes comprise activated carbon. In general, the activated carbon may be any suitable activated carbon known to one of ordinary skill in the art. In some embodiments, the activated carbon has a mean primary particle size of 2 to 10 μm, preferably 3 to 9 μm, preferably 4 to 8 μm, preferably 5 to 7 μm. In some embodiments, the activated carbon has a BET surface area of 1250 to 2250 m$^2$/g, preferably 1300 to 2150 m$^2$/g, preferably 1400 to 1950 m$^2$/g, preferably 1500 to 1850 m$^2$/g. In some embodiments, the activated carbon has a density of about 350 to 550 kg/m$^3$, preferably about 375 to 525 kg/m$^3$, preferably about 400 to 500 kg/m$^3$, preferably about 425 to 475 kg/m$^3$, preferably about 450 kg/m$^3$. In some embodiment, the activated carbon is present in an amount of 60 to 98 wt %, preferably 63 to 96 wt %, preferably 65 to 94 wt % preferably 68 to 92 wt %, preferably 70 to 90 wt %, preferably 72 to 88 wt %, preferably 74 to 86 wt %, preferably 76 to 84 wt %, preferably 78 to 82 wt %, preferably 80 wt %, based on a total weight of the carbon electrode.

In some embodiments, the electrodes comprise a conductive electrode support on which the carbon is disposed. Such a conductive electrode support may also be referred to as a "collection layer" or a "current collector". In some embodiments, the conductive electrode support is a metal support. Examples of metals which may be used in the metal support include, but are not limited to gold, silver, iron, copper, aluminum, platinum, nickel, and titanium. In some embodiments, the metal support is aluminum. In general, the conductive electrode support may be any suitable shape or geometry known to one of ordinary skill in the art. Examples of such shapes or geometries include foils, meshes, foams, porous sheets, and bound aggregates.

In some embodiments, the electrodes comprise a binder. In general, the binder may be any suitable binder known to one of ordinary skill in the art. Examples of binders include, but are not limited to for example, poly(vinylidene difluoride) (PVdF), polytetrafluoroethylene (PTFE), styrene butadiene rubber (SBR), carboxymethyl cellulose (CMC optionally as a salt, e.g., Na, K, Li, or the like), polyacrylic acid, polyethylene glycol (PEG), polyacrylonitrile, polystyene, polyurethane, polyisoprene, polyethylene, polypropylene, ethylene propylene diene monomer (EPDM) rubber, poly (vinyl butyral), poly(vinyl acetate), poly(butyl acrylate), poly(methyl acrylate), chitosan, alginate, pectin, amylose, xanthan gum, gum arabic, gellan gum, Carrageenan, karaya gum, cellulose, guar gum, Tara gum, Tragacanth gum, gelatin, and caseinate. In some embodiments, the binder is present in an amount of 1 to 20 wt %, preferably 2 to 18 wt %, preferably 3 to 17 wt %, preferably 4 to 16 wt %, preferably 5 to 15 wt %, preferably 6 to 14 wt %, preferably 7 to 13 wt %, preferably 8 to 12 wt %, preferably 9 to 11 wt %, preferably 10 wt %, based on a total weight of the carbon electrode.

In some embodiments, the flexible energy storage device comprises an electrolyte support. The electrolyte support may be any suitable structure, at least a portion of which is located between the pair of electrodes, which provides a mechanical benefit to the flexible energy storage device, for example, by increasing a flexural stiffness of the device, enhancing mechanical integrity of the gel electrolyte, or preventing loss of the gel electrolyte; and/or which provides an electrical benefit to the flexible energy storage device, for example, by increasing capacitance, increasing an operable temperature range of the energy storage device, or increasing the energy density of the device. In some embodiments, the electrolyte support may maintain or help maintain the flexible energy storage device in a bent state, even in the absence of an external bending force. In alternative embodiments, the electrolyte support may provide a restoring force which restores or helps restore the flexible energy storage device to an unbent state in the absence of an external bending force. In general, the electrolyte support may be placed in any configuration with the gel electrolyte, provided that at least a portion of the electrolyte support is located between the electrodes. For example, the electrolyte support may be disposed between an electrode and the gel electrolyte, be embedded within the gel electrolyte, surround the gel electrolyte, or encompass and penetrate the gel electrolyte such that the gel electrolyte is embedded within the electrolyte support. In general, the electrolyte support may be any suitable shape known to one of ordinary skill in the art. Examples of such suitable shapes include, but are not limited to a mesh, a screen, and a film. In some embodiments, the electrolyte support is non-conductive. In alternative embodiments, the electrolyte support is conductive. In such embodiments, the electrolyte support should not cause a short-circuit or other detrimental electrical behavior of the flexible energy storage device. The electrolyte support may be constructed of any suitable material known to one of ordinary skill in the art. Examples of such suitable materials include, but are not limited to metals such as aluminum, gold, copper, and silver, and polymers. In some embodiments, the electrolyte support comprises an elastomeric material. As the electrolyte support is a separate structure, which may be in contact with but does not form part of the gel which makes up the gel electrolyte, the inclusion of a polymer or polymer-containing electrolyte support layer should not be considered to be an inclusion of a polymer in the gel electrolyte.

In some embodiments, the flexible energy storage device may comprise an electrode integration layer. The electrode integration layer is a material disposed between an electrode and the gel electrolyte. The electrode integration layer may be advantageous for providing a mechanical benefit, electrical benefit, or both, as described above. The electrode integration layer may further be advantageous for enhancing contact or contact integrity between the electrode and the gel electrolyte. Such contact or contact integrity may be enhanced in a mechanical sense, for example greater adhesion or adhesion over a wider temperature range; in an electrical sense, for example greater conductivity or providing a material of intermediate conductivity between the electrode and the gel electrolyte; or both. The electrode integration layer may be any suitable material known to one of ordinary skill in the art. In some embodiments, the electrode integration layer is a polymer. In some embodiments, the electrode integration layer is a biopolymer. Examples of biopolymers include cellulose, alginate, chitin, chitosan, collagen, fibrinogen, and polylactic acid.

In some embodiments, the electrolyte support and/or the electrode integration layer comprise surface hydroxyl functional groups. Such surface hydroxyl functional groups may be advantageous for increased contact or integration with the gel electrolyte. Such surface hydroxyl functional groups may be part of the structure of the material of which the electrolyte support and/or electrode integration layer is made up, for example chitosan and cellulose. Alternatively, such surface hydroxyl functional groups may be added via a surface treatment. The surface treatment may convert non-hydroxyl functional groups to hydroxyl functional groups, for example the reduction of carbonyl or carboxyl groups. Alternatively, the surface treatment may add a hydroxyl functional group-containing material to the surface of the electrolyte support and/or electrode integration layer. The hydroxyl functional group-containing material may form chemical bonds to the electrolyte support and/or electrode integration layer such as with hydroxyl-containing silanes, hydroxyl-containing organometallic materials, or hydroxyl-containing metal coordination material. Alternatively, the hydroxyl functional group-containing material may not form chemical bonds with the electrolyte support and or electrode integration layer as in hydroxyl-containing resins or hydroxyl-containing polymer coatings.

In some embodiments, the flexible energy storage device may comprise organic redox-active additives such as quinone compounds, hydroquinone compounds, indole compounds, and halogenated derivatives thereof. Examples of such exclude organic redox-active additives include hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid, methylparabin, 2,5-dihydroxy-1,4-benzoquinone, resorcinol, ascorbic acid, ascorbic acid derivative, 1,4-dihydroxy benzene, 3-hydroxy tyramine (dopamine), rhodizonic acid, co-enzyme Q, 1,2,3-trihydroxy benzene (pyrogallol), 1,3,5-trihydroxy benzene (phloroglucinol), tetrahydroxy quinone (THQ), tetrahydroxy acetophenone, tetrahydroxy benzoic acid, hexahydroxy benzene, tetrahydroxy quinone, hexahydroxybenzene, chloranilic acid, chloranilic acid, chloranil, rhodizonic acid, fluoroanilic acid, reduced fluoroanilic acid, fluoranil, duroquinone, 1-nitroso-2-napthol, martius yellow, hydroxy-1,4-naphthaquinone, naphthalene diol, tetrahydroxy napthalene, tetrahydroxy 1,4-naphthaquinone, echinochrome, pentahydroxy 1,4-naphthaquinone, anthranol, hydroxy anthraquinone, anthralin, anthrarufin, alizarin, di-hydroxyanthraquinone, anthrobin, anthragallol, purpurin, 1,8,9-anthracenetriol, 1,2,5,8-tetrahydroxyanthraquinone, carminic acid, purpogallin, hydroxybenzophenone, hydroquinone monobenzylether, hydroxy biphenyl, 2,2,4,4-tetrahydroxy benzophenone, phenolphthalein, indophenol, bromophenol blue, methylenedigallic acid, methylenedisalicyclic acid, 5-hydroxy-2(5H)-furanone, hydroxycourmarin, fustin, hydroxindole, tetrahydropapaveroline, oxindole, o-phenanthroline, phenanthridine, 6(5H)phenanthridinone, hydroxyjulolidine, citrazinic acid, uracil, 2-amino-5-bromopyridine, 5-aminotetrazole monohydrate, 2-aminothiazole, 2-aminopyrimidine, 2-amino-3-hydroxypyridine, 2,4,6-triaminopyrimidine, 2,4-diamino-6-hydroxy pyrimidine, 5,6-diamino-1,3-dimethyluracil hydrate, 5,6-diamino-2-thiouracil, cyanuric acid, and/or hydroxy methyl pyridine. In some embodiments, the redox active flexible energy storage device is substantially free of organic redox-active additives.

In some embodiments, the flexible energy storage device is a battery. In general, the battery may be any suitable type of battery known to one of ordinary skill in the art. In some embodiments, the battery is a lithium ion battery. In such embodiments, the secondary ionic substance comprises lithium. In some embodiments, the lithium ion battery has at least one electrode comprising a lithium-containing material.

The present disclosure also relates to a method of forming the flexible energy storage device. The method comprises: mixing the secondary ionic substance and the glycerol preferably at a temperature between 25 to 75° C. to produce an ion-containing mixture; adding to the ion-containing mixture a salt comprising the redox-active molybdenum-containing ions to form an uncured gel; vacuum-drying the uncured gel to form the gel electrolyte; disposing the gel electrolyte on a first electrode such that the gel electrolyte forms a uniform film covering an entirety of a top surface of the first electrode; and placing onto the gel electrolyte a second electrode such that the second electrode is separated from the first electrode by the gel electrolyte to form the flexible energy storage device. In some embodiments, one or both of the electrodes are carbon electrodes as described above. In preferred embodiments, both of the electrodes are carbon electrodes as described above. In some embodiments, the carbon electrodes are prepared by uniformly depositing on a conductive electrode support a film and comprising activated carbon, conductive carbon, and a binder such that an entirety of a top surface of the conductive electrode support is individually covered by the film to form a carbon electrode. The conductive electrode support, activated carbon, conductive carbon, and binder may be as described above.

EXAMPLES

Materials: Glycerol, potassium hydroxide pellets, and ammonium molybdate tetrahydrate were obtained from Sigma Aldrich. 1-ethyl-3-methylimidazolium tetrafluoroborate (IL) (AK Scientific Inc.), 1-methyl-2-pyrrolidone (NMP), and dimethyl sulfoxide (DMSO) were purchased from Merck. Polyvinylidene fluoride (HSV 900 PVDF) binder for a Li-ion battery electrode, conductive carbon, 2-Kuraray active carbon for a supercapacitor electrode (AC), and conductive additive (Timical super C65) (MTI).

Electrode and Electrolyte Preparation: Anhydrous Gly-KOH—Mo gel electrolytes were applied to supercapacitor devices by preparing various concentrations of KOH (1M, 3M, and 5M KOH) in Gly by dissolving the calculated amount of KOH. The solutions were mixed at 50° C. until producing a homogenous transparent mixture. After cooling, the Gly-KOH electrolyte was doped with Mo at weight fractions of $3^{-15}\%$ with respect to Gly. The final mixture, which formed a jelly-like solution (abbreviated as Gly-KOH—MoX, where X=3, 5, 10, and 15% w/w), was vacuum dried to remove free-water and drop-cast onto the electrodes. Carbon composite (CC) electrodes for supercapacitor applications were fabricated with AC as the main electrode material (80% w/w), along with polymeric binder (PVDF, 10% w/w) and conductive carbon (10% w/w).

Fabrication of Supercapacitor Devices: Supercapacitor devices were assembled and configured as Al/CC/electrolyte/CC/Al. Anhydrous electrolytes with 1M, 3M, and 5 M KOH in glycerol (Gly) were directly used as electrolyte with and without doping with Mo. Cyclic voltammetry (CV) and galvanostatic charge-discharge (GCD) studies were conducted with the fabricated supercapacitor devices. The devices were tested with a battery analyzer using a split cell. The GCD tests were conducted under current densities from 1 to 5 A g$^{-1}$ by holding the cut-off voltage between −1 and 1 V. The CV tests were conducted by using an electrochemical analyzer (Palmsens Emstat5) at scan rates ranging from 10 to 100 mV s$^{-1}$.

Fabrication and Characterization of Bio-inspired Electrolyte: Referring to the illustrations in FIGS. 1A and 1D, the Gly-KOH—Mo structure and properties are depicted along with the chemistry and formulation that plays a significant role in the high mobility of the ions through the chain structure as described in Applied Catalysis B: Environmental, 2018, 224, pp. 533$^{-540}$, which is incorporated by reference herein in its entirety. By heating the solution of KOH—Mo in Gly, ammonium converts to ammonia gas and remaining protons react with hydroxide to form water where both are removed from the solution via a drying process. Then the interaction of Gly and Mo forms a network structure as shown in FIG. 1D. The final solution formed viscous gels with a noticeable color change, producing transparent and pale yellowish anhydrous gels as shown in FIG. 1B. The gels become more viscous as the Mo content increases. Referring to FIG. 1C which shows the spreading tests of pure Gly and Gly-KOH—Mo electrolytes over a glass substrate over time. Depending on the diameter of the circular droplets formed, the spread of the Gly-KOH—Mo (light yellow) electrolyte was limited compared to pure Gly (transparent and colorless), resulting in a denser structure formation after complexing with KOH and Mo.

The IR spectrum of Gly-KOH displays intense and sharp absorptions at 1149-928 cm$^{-1}$ belonging to C—O stretching and bands in the range of 3000-2850 cm$^{-1}$ related to C—H stretching. The broad peaks at 1350-1450 cm$^{-1}$ and 3450 cm$^{-1}$ are associated with C—H and O—H vibrations, respectively as seen in FIG. 1E and described in Thermochimica Acta, 2013, 573, 146-157, which is incorporated by reference herein in its entirety. After doping of Mo into the bio-electrolyte, the C—O peak at 1026 cm$^{-1}$ shifted slightly, and the intense peak at 851 cm$^{-1}$ disappeared, which is due to complex formation. The complexation of Gly with other transition metal oxides was also reported in previous study J. The Electrochemical Society, 2012, 159, A843-A847, which is incorporated by reference herein in its entirety.

Figure 1F:
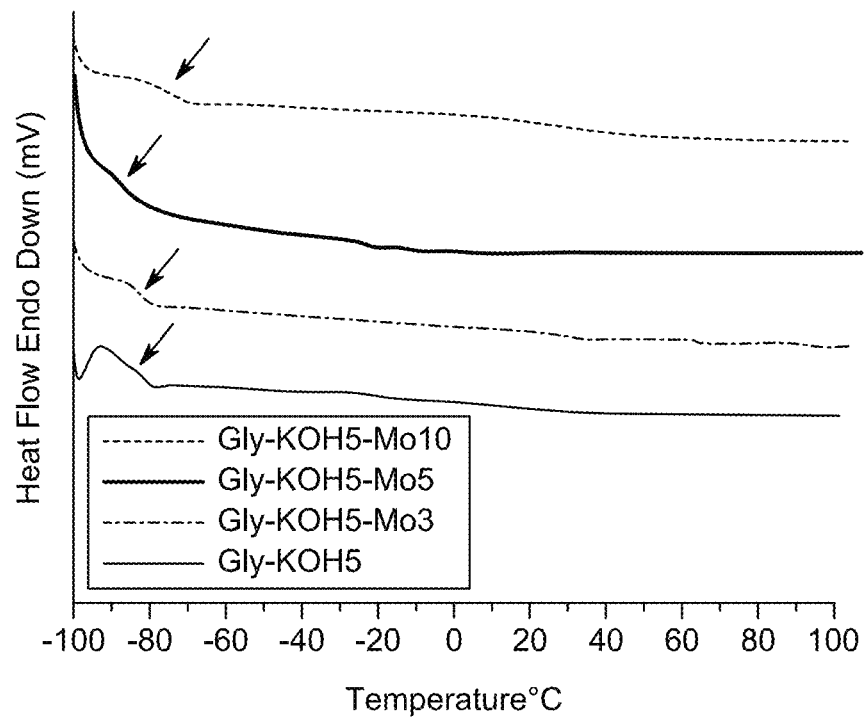
FIG. 1F shows Differential scanning calorimetry (DSC) profiles of the electrolytes.
Figure 1G:
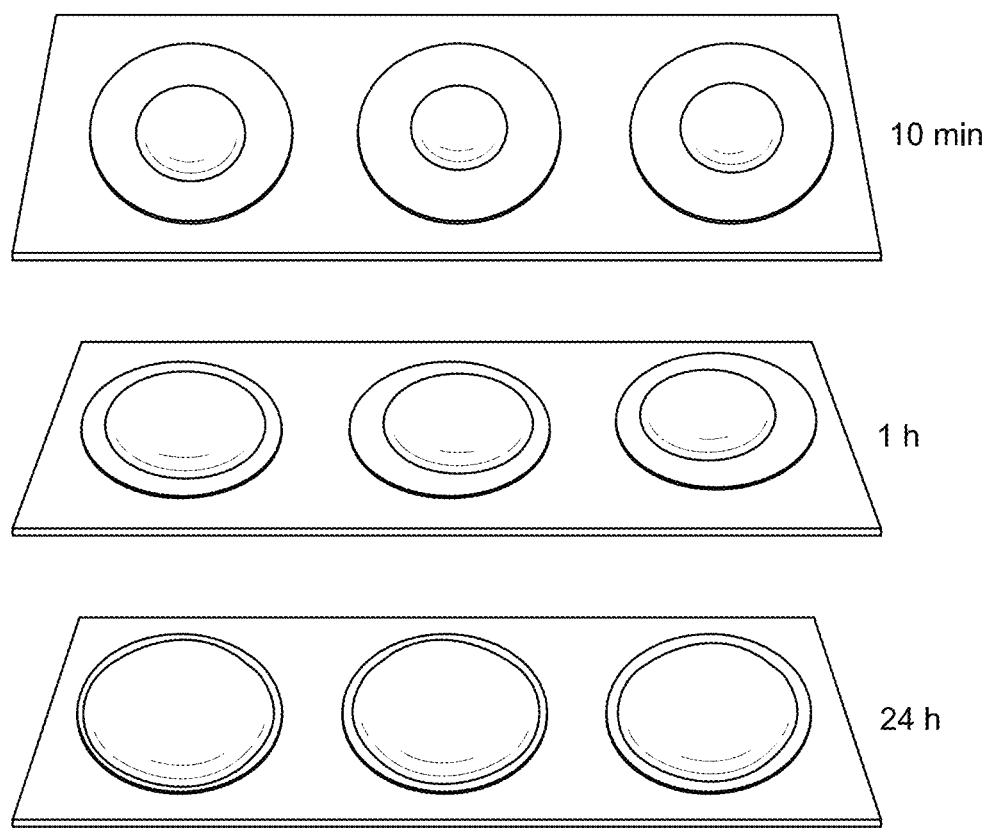
FIG. 1G shows time-dependent electrolyte adhesion and spreading along the surface of the carbon composite (CC) electrode.
Figure 6:
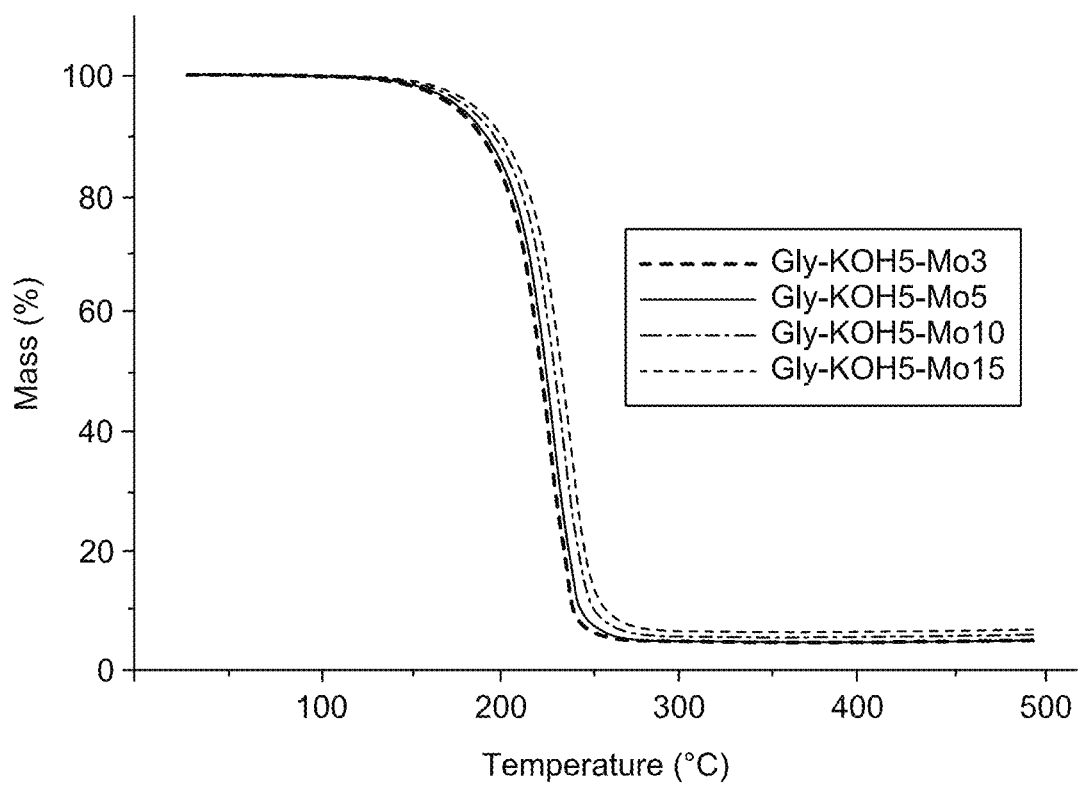
FIG. 6 shows thermogravimetric analysis (TGA) thermograms of Gly-KOH—MoX electrolytes.
Figure 7A:
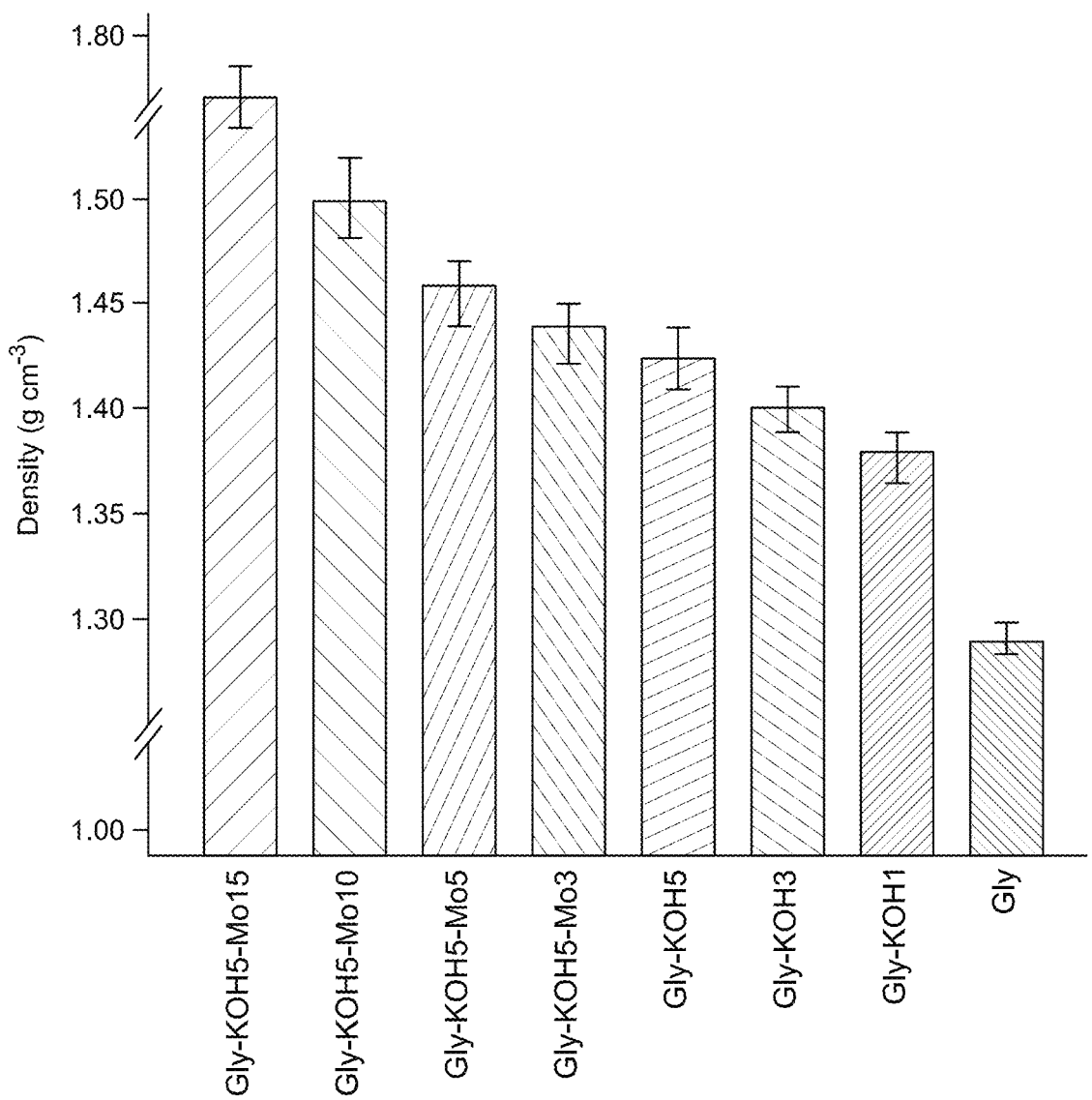
FIG. 7A shows density of the electrolytes.

The thermal stability of the electrolytes was investigated between RT and 500° C. under inert atmosphere and all redox active electrolytes were stable up to at least 175° C. shown in FIG. 6. The thermal transitions of the Gly and Mo-doped anhydrous electrolytes were measured by DSC as depicted in FIG. 1F. The gel electrolytes had glass transition temperatures ($T_g$) of −85° C. for Gly-KOH5, −84° C. for both Gly-KOH5-Mo3 and Gly-KOH5 and −80° C. for Gly-KOH5-Mo10. It is clear that after Mo doping, the $T_g$ of the electrolytes shifted to higher temperatures. These results are additional confirmation for the complex formation shown in FIG. 1D. The density profiles of the all the gel electrolytes are plotted in FIG. 7A. Time-dependent absorption tests performed with three identical carbon electrodes with Gly-KOH5-Mo10 electrolyte. The spreading and adsorption along the surface of the carbon composite electrodes are displayed in FIG. 1G. The electrolyte fully spread over the substrate by wetting the carbon electrode in all three cases after 24 h. The time-dependent adhesion supports the compatibility of both electrode and electrolyte.

Figure 2A:
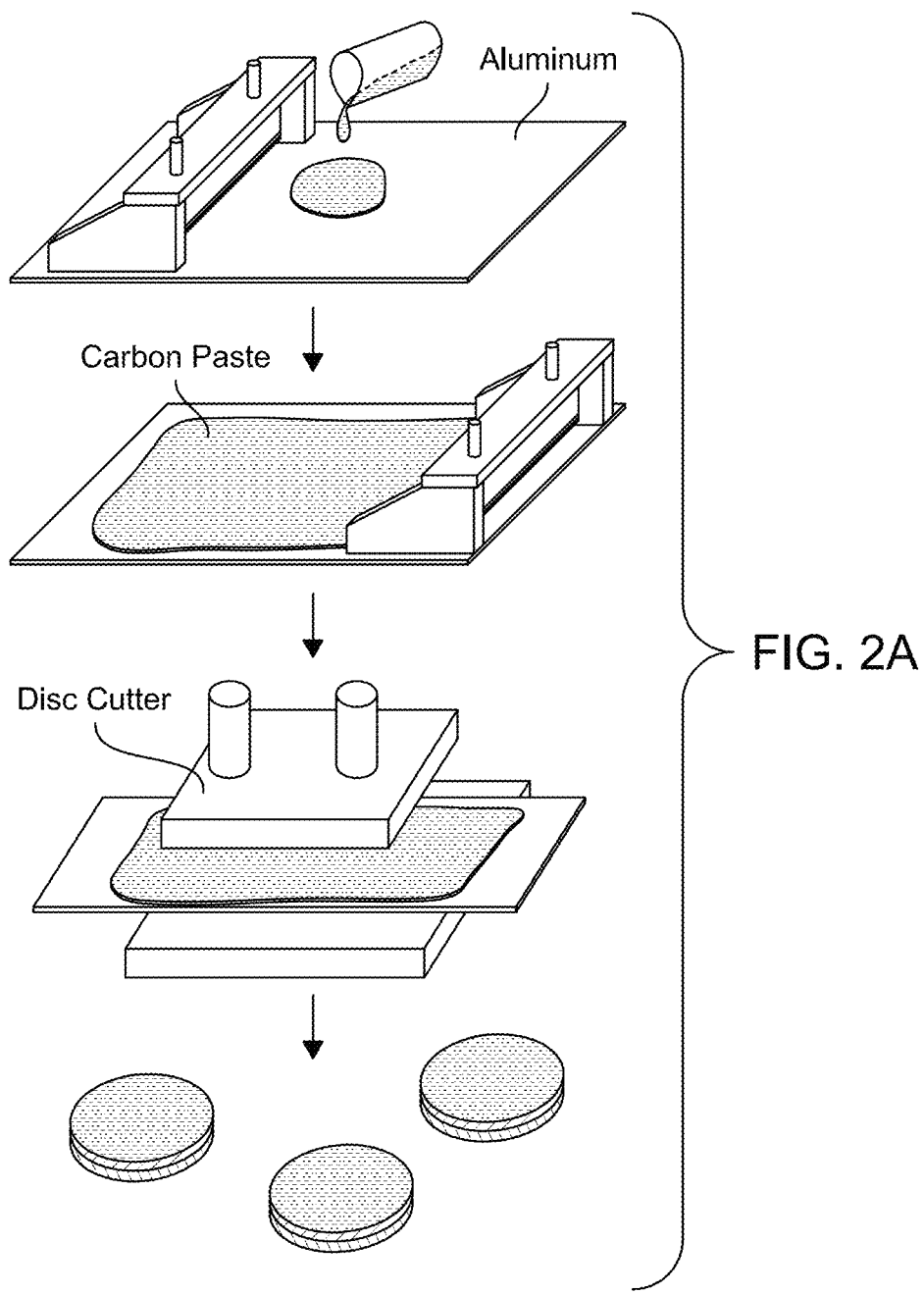
FIG. 2A represents fabrication procedure for CC-electrodes, casting onto an aluminum substrate by a coating machine, and production of circular electrodes via disk cutter.
Figure 2B:
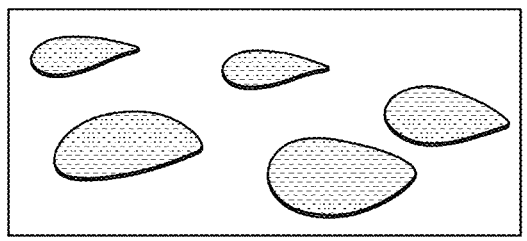
FIG. 2B represents fabrication procedure for CC-electrodes, casting onto an aluminum substrate by a coating machine, and production of circular electrodes via disk cutter.

Fabrication of Flexible Electrodes: The electrodes were fabricated by uniformly coating a homogeneous CC slurry onto an aluminum substrate which acts as current collector using a coating machine. The fabrication procedure is shown in FIG. 2A. Then, the CC-coated aluminum was dried and cut into circular electrodes by using electrode punch as seen in FIG. 2B. The average loading of the electrodes was 1 mg cm$^{-2}$. Photographs show the high mechanical strength and flexibility of the fabricated CC-coated aluminum electrodes from different sectional views shown in FIG. 2C and FIG. 2D.

Figure 2G:
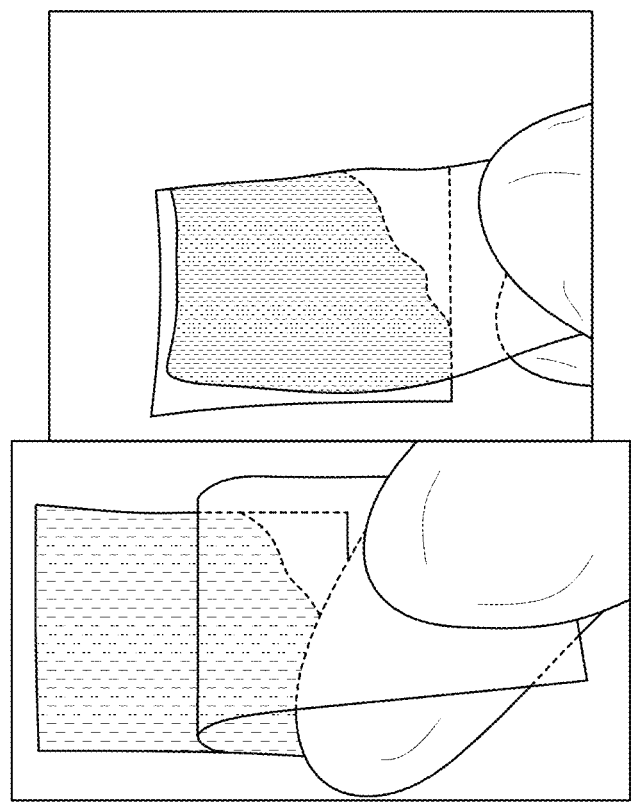
FIG. 2G shows mechanical rubbing test of CC-electrodes by using commercial Scotch® tape.

Referring to FIG. 2E and FIG. 2F, the SEM images of the surface of the carbon composite specimens indicate a surface roughness and a porous structure. This result could be due to uniform distribution and dispersion of PVDF, conductive carbon, and AC particles in an NMP-forming compact conductive matrix. The electrodes were precisely cast on the aluminum substrate with controlled thicknesses to produce thin films as shown in FIG. 2F. Their cross-sections had nearly the same thickness of ~15 μm. A mechanical rubbing test was carried out to check the robustness of the adhesion of the coated composite electrode on the substrate. Neither delamination nor peeling-off of the thin carbon film was noticed in a Scotch® tape test depicted in FIG. 2G.

Figure 3A:
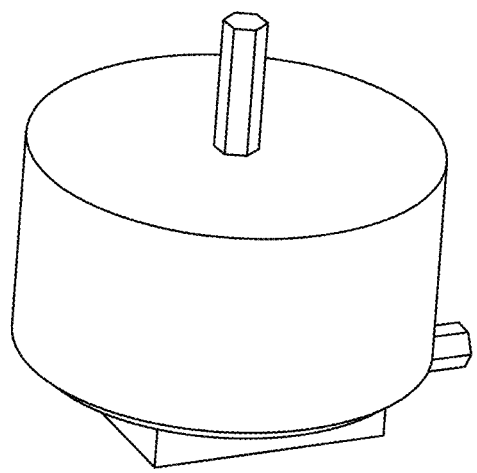
FIG. 3A shows design of an exemplary split cell used for galvanostatic charge-discharge (GCD) and electrochemical measurements.
Figure 3B:
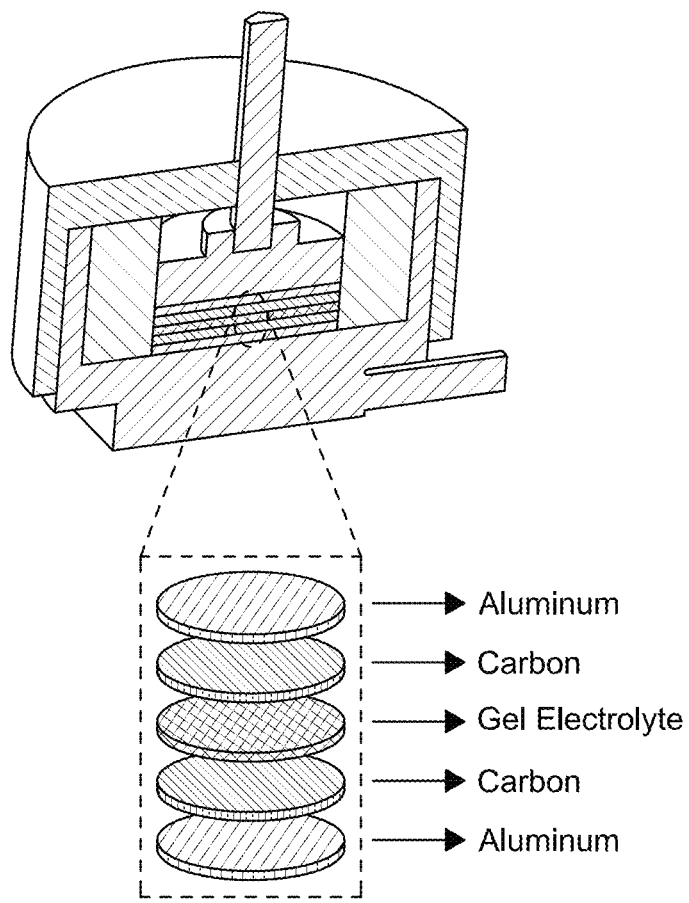
FIG. 3B shows cross-sectional illustration of the exemplary split cell.
Figure 3C:
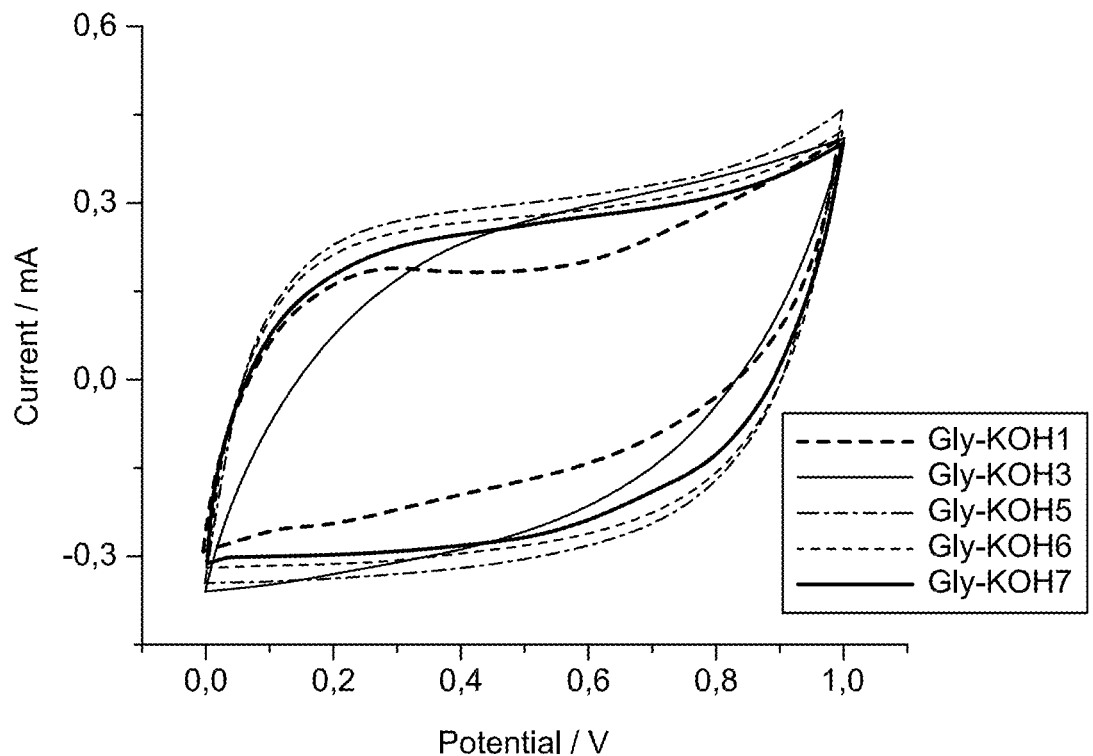
FIG. 3C shows cyclic voltammetry (CV) profiles of the anhydrous electrolyte (Gly-KOH1, Gly-KOH3, and Gly-KOH5) in a potential range of $0^{-1}$ V at scan rate of 10 mV s$^{-1}$.
Figure 3D:
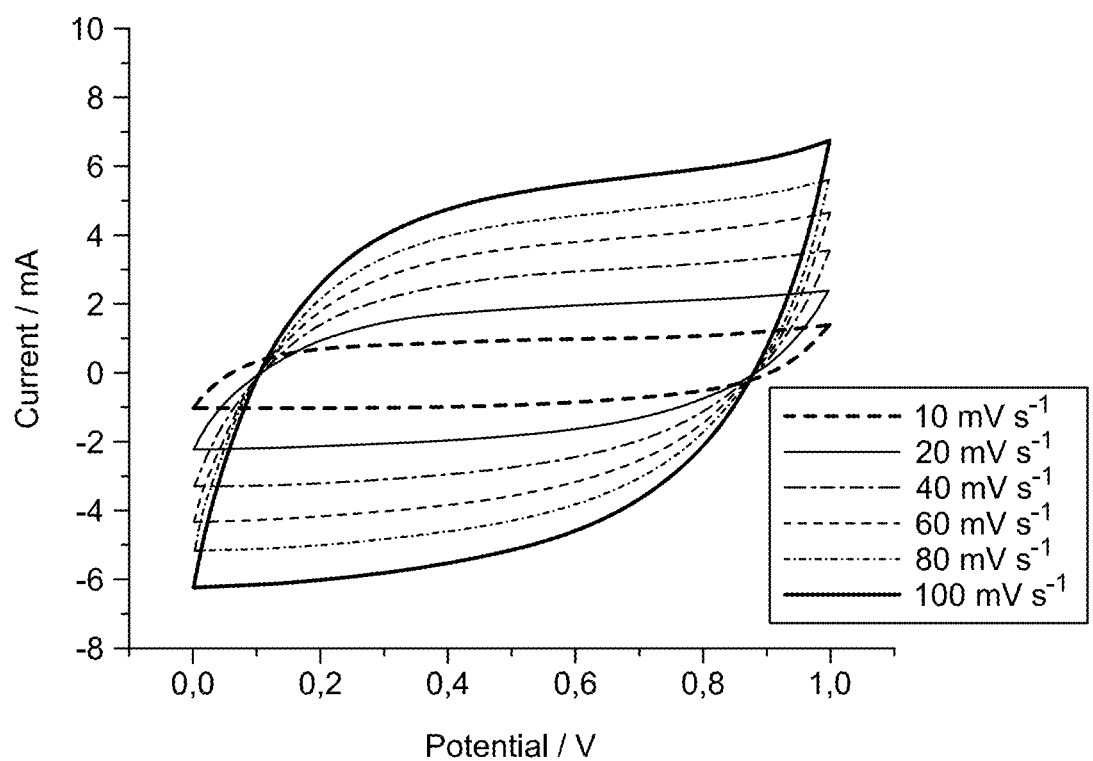
FIG. 3D shows CV profiles of Gly-KOH5 at different scan rates in a potential range of0 to +1 V.

Construction and Electrochemical Tests of Devices: Referring to FIG. 3A and FIG. 3B, CV studies were performed on supercapacitors with the different anhydrous electrolytes (Gly-KOH1, Gly-KOH3, and Gly-KOH5) using a split cell within a potential window of 0 to +1 V at a scan rate of 10 mV s$^1$. The CV curves for all cells displayed a quasi-rectangular shape, indicating appreciable electric double-layer capacitance (EDLC) behavior shown in FIG. 3C. The capacitive nature of the cells increased with increasing KOH content up to KOH5. It is seen in the CV voltammogram that the further increase in the concentration of KOH (KOH6 and KOH7) does not increase the capacitance of the system as seen in FIG. 3C. This can be explained by the increase of viscosity and the lack of diffusion of the electrolyte through the pores of the carbon, and therefore a lower capacitive behavior is observed. As a result, Gly-KOH5 was selected as the substrate for doping with Mo. This result is confirmed by the GCD measurements as shown in FIG. 8A-8D. The ion diffusion capability of Gly-KOH5 was tested at various scan rates from 10 to 100 mV s$^{-1}$, and the CV curves retained a quasi-rectangular shape as shown in FIG. 3D. These profiles suggest that the Gly-KOH system is suitable for supercapacitor applications with reversible charge-discharge capacitive properties.

Figure 3E:
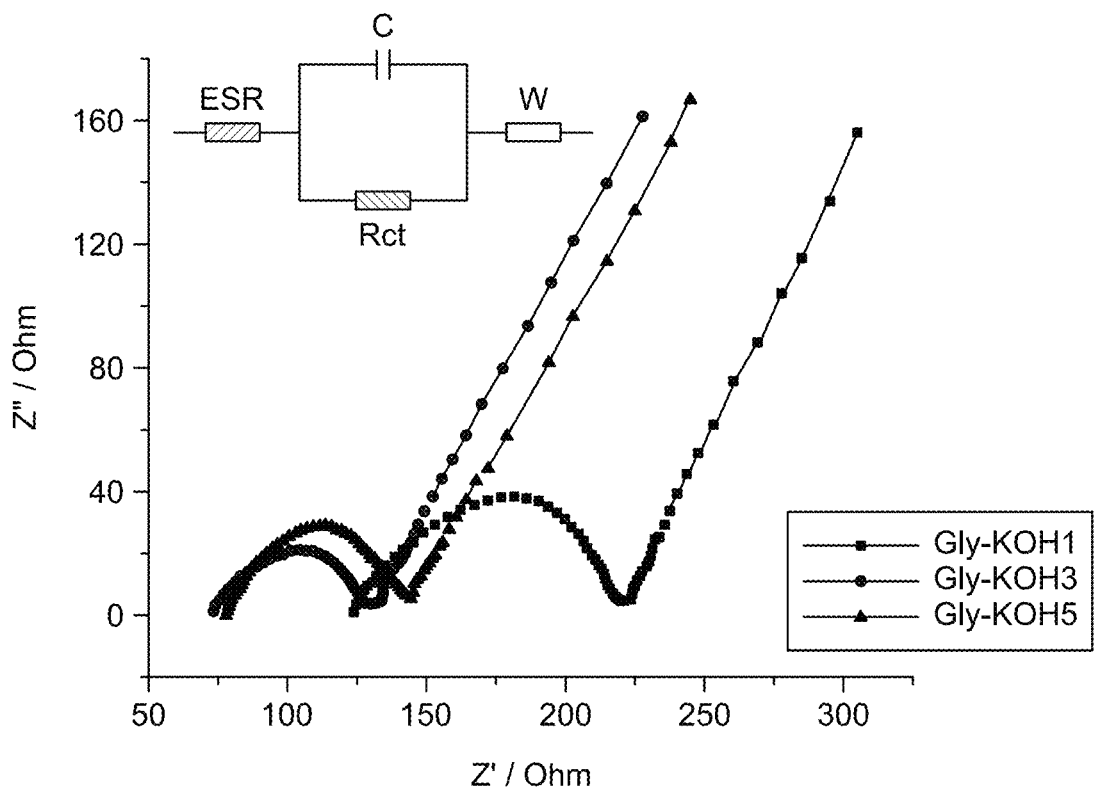
FIG. 3E shows Nyquist plots for Gly-KOH1, Gly-KOH3, and Gly-KOH5 containing devices.

Further investigation of the device performance was performed via the Nyquist graphs as shown in FIG. 3E. Data was obtained by fitting the equivalent circuit diagram shown in inset of FIG. 3E using Palmsens Emstat5 software. The resistance values for Gly-KOH1, Gly-KOH3, and Gly-KOH5, which represent the equivalent series resistance (ESR) at the x-axis intersection points [Advanced Energy Materials, 2018, 8, 1702630, International J of Energy Research, 2020, 44, 4309$^{-4320}$, incorporated by reference herein in its entirety.], were found to be 72.2, 75.5 and 119.7 ohm, respectively. The line in the low frequency region makes an angle of 450 with the real axis, representing the Warburg resistance (W) [J. of Molecular Liquids, 2020, 301, 112400 incorporated by reference herein in its entirety]. The charge transfer resistance (Rct) values for Gly-KOH1, Gly-KOH3, and Gly-KOH5 were 73.20, 44.60, and 27.50 ohm, respectively.

Figure 3F:
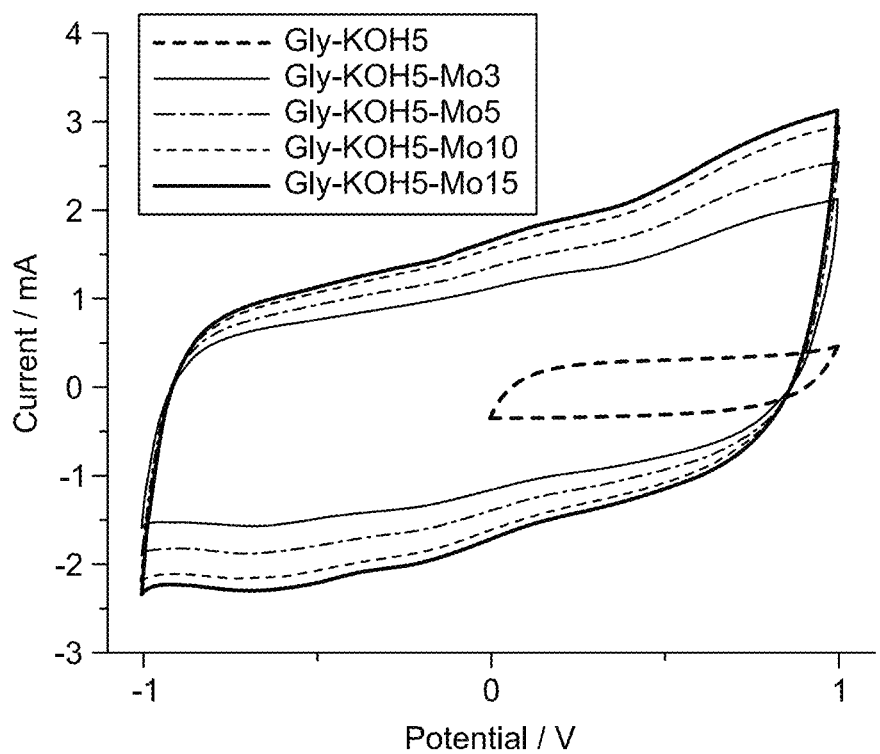
FIG. 3F shows CV profiles of Gly-KOH5 and redox active anhydrous electrolytes (Gly-KOH5-Mo3, Gly-KOH5-Mo5, Gly-KOH5-Mo10, and Gly-KOH5-Mo15) in a potential range of −1 to +1 V at scan rate of 10 mV s$^{-1}$.
Figure 3G:
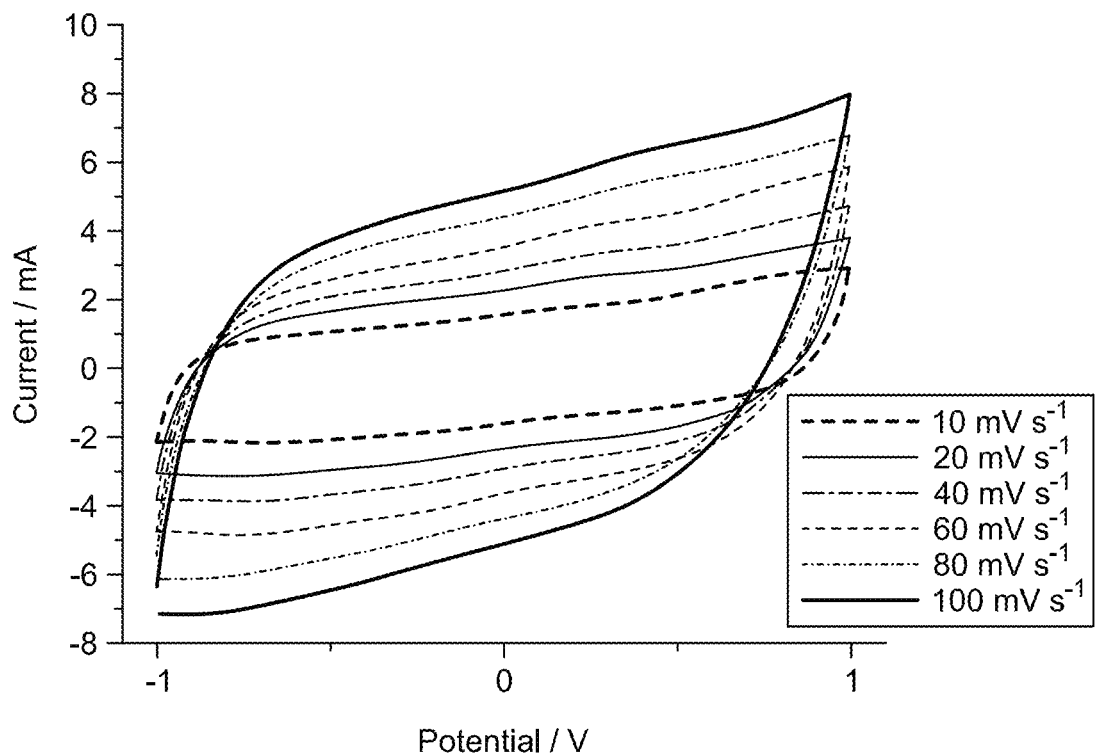
FIG. 3G shows CV profiles of Gly-KOH5-Mo10 at various scan rates ($10^{-100}$ mV s-1) in a potential range of −1 to +1 V.

Referring to FIG. 3F, the CV results for Gly-KOH5 containing supercapacitors after doping with different Mo concentrations (Gly-KOH5-Mo3, Gly-KOH5-Mo5, Gly-KOH5-Mo10, and Gly-KOH5-Mo15) in a potential range of −1 to +1 V, are depicted. These CV curves show reversible quasi-rectangular shapes in the active potential region of molybdate ions, indicating that the capacitance of the electrolytes with Mo content is higher than that with Gly-KOH5. This is mainly explained by redox couples of molybdate ions Mo(VI)/Mo(V) and Mo(III)/Mo(IV) which were obtained by the reversible peaks centered around $^{-0.24}$ V and +0.12 V, $^{-0.65}$ V and 0.7 V, respectively [Electrochimica Acta, 2015, 158 361$^{-367}$ incorporated by reference herein in its entirety]. Redox ions in the double layers of the supercapacitor have a pseudocapacitive effect, which leads to the extra charge that increases the capacitance of the devices. Furthermore, the enhancement in the redox activity of glycerol electrolyte mainly depends on the active hydroxyl groups which provide better metal ions adsorption characteristics onto the electrode surface [J. Electrochem. Soc., 2012, 159, A843-A847 incorporated by reference herein in its entirety]. The area under the CV curves gradually increase as the concentration of Mo increases (up to Mo10), and then tends to stabilize. Thus, Gly-KOH5-Mo10 electrolyte was chosen as the optimum composition for supercapacitor applications. The curves also demonstrate improved charge storage capacity as compared to the Gly-KOH5 electrolyte without Mo. This increased charge storage capability is attributed to EDLC and redox contributions of the molybdate ions [Nano Energy, 2019, 104226 incorporated by reference herein in its entirety.]. Moreover, the CVs assume similar shapes and current densities at various scan rates, suggesting that the super-capacitive behavior of the device with Gly-KOH—Mo is unimpeded because of the fast ion diffusion in nonaqueous electrolyte as shown in FIG. 3G.

Figure 3H:
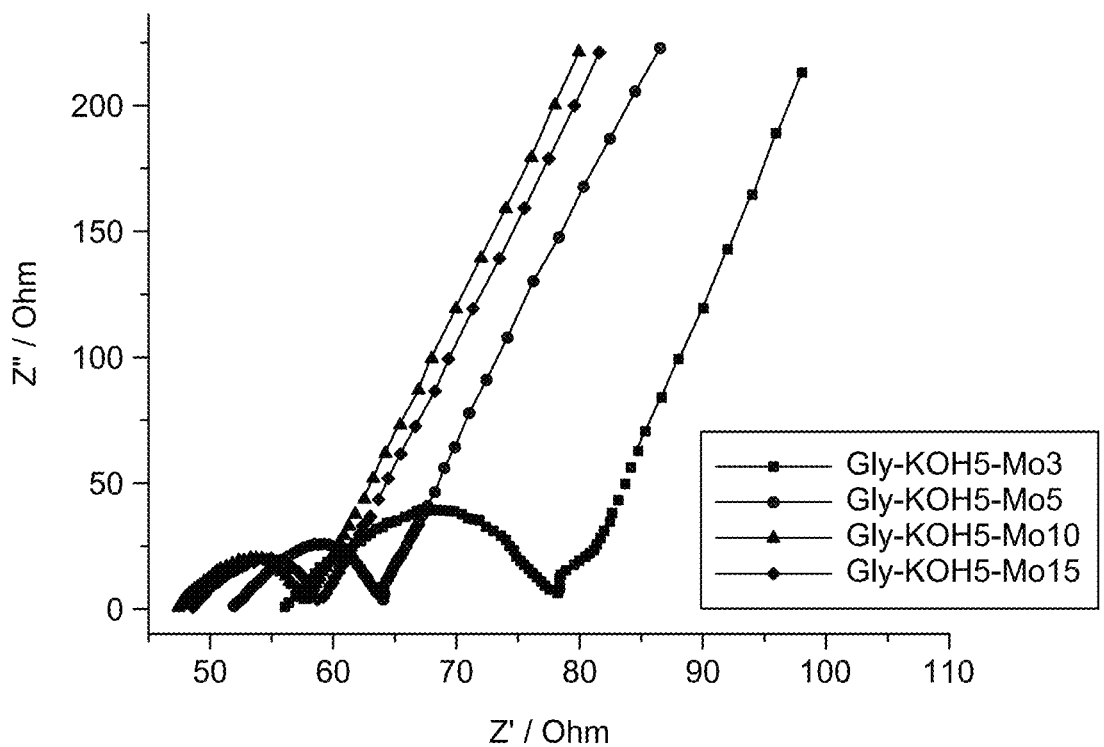
FIG. 3H shows Nyquist plots for Gly-KOH5-Mo10, Gly-KOH5-Mo10, and Gly-KOH5-Mo10 containing devices.
Figure 7B:
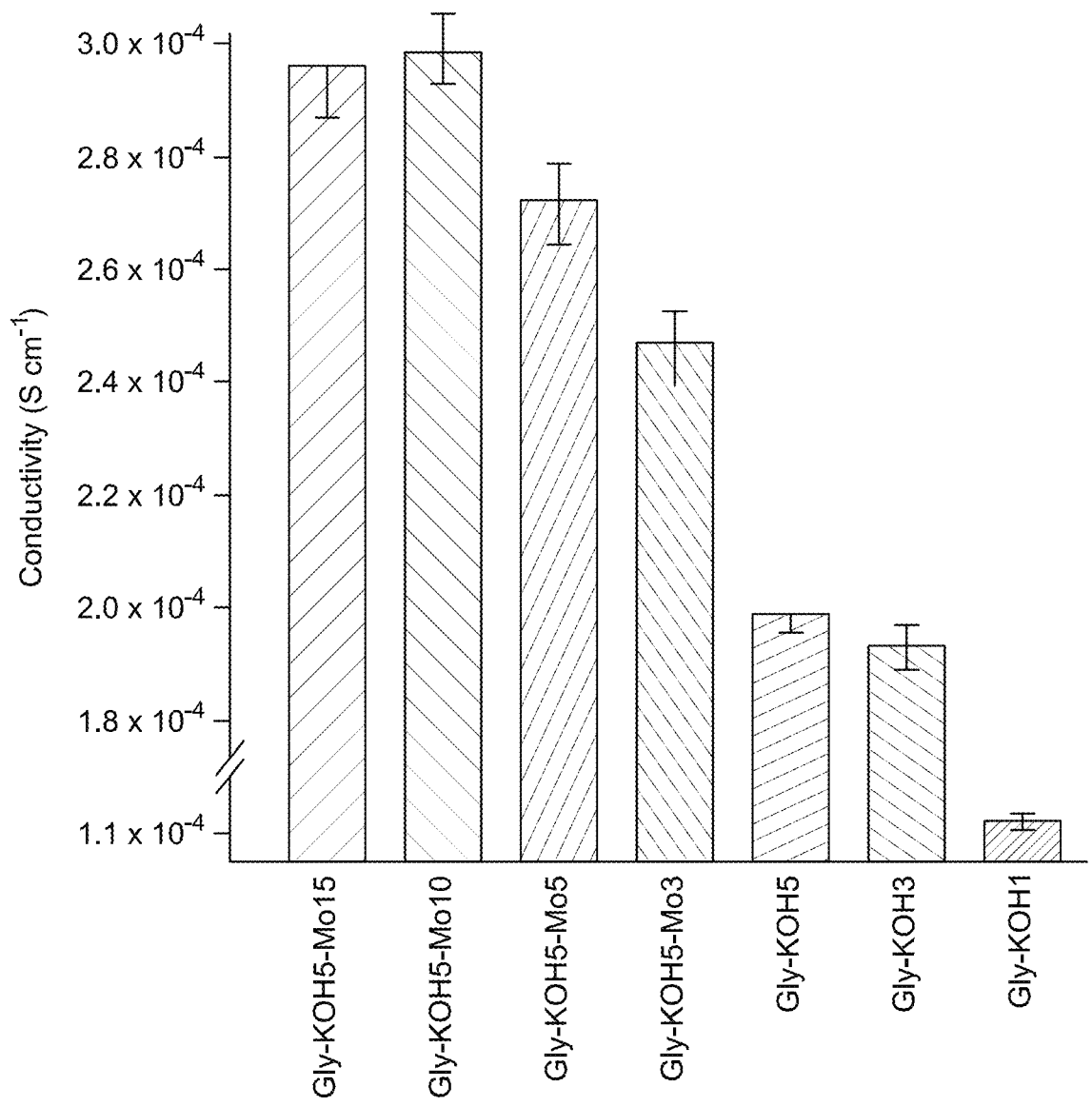
FIG. 7B shows ionic conductivity versus specific capacitance of the different electrolyte-based supercapacitors.
Figure 8A:
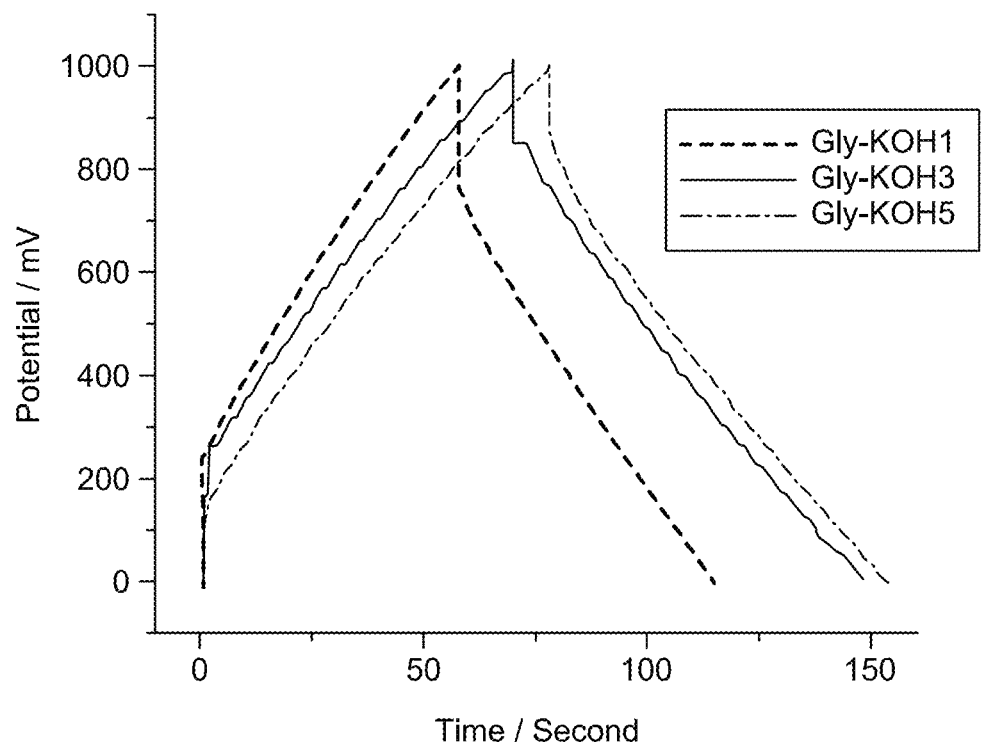
FIG. 8A shows GCD comparison of Gly-KOH1, Gly-KOH3, and Gly-KOH5 at current densities from 1 A g−1 in the voltage range of 0 to 1 V.
Figure 8B:
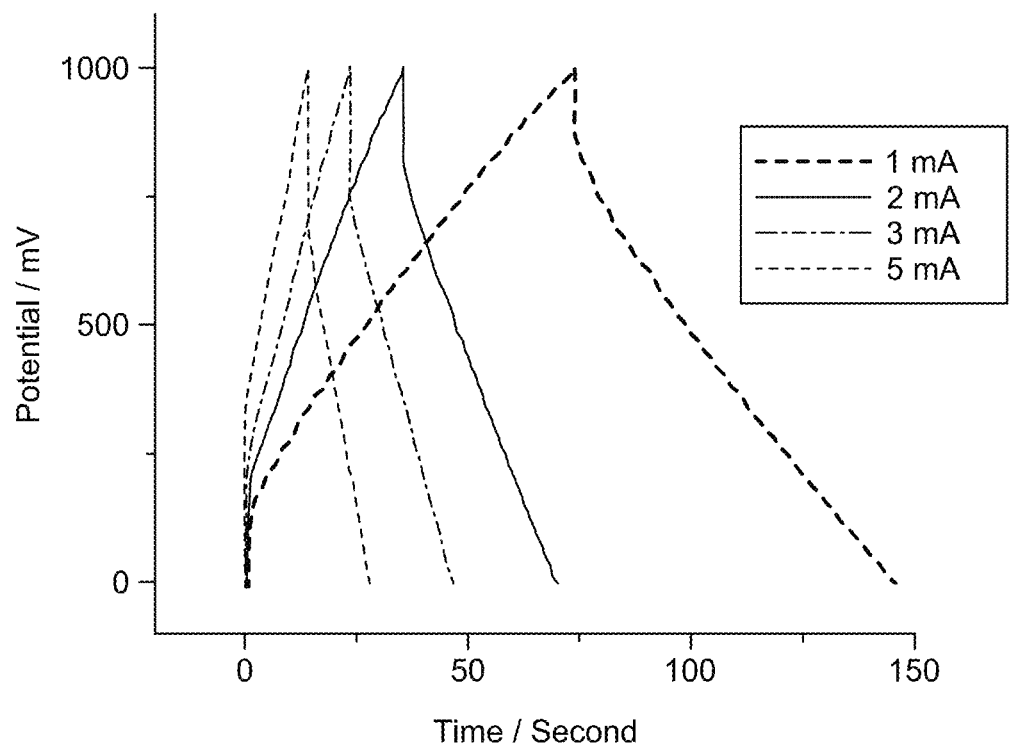
FIG. 8B shows GCD measurements of Gly-KOH5 based supercapacitor at different current densities.
Figure 8C:
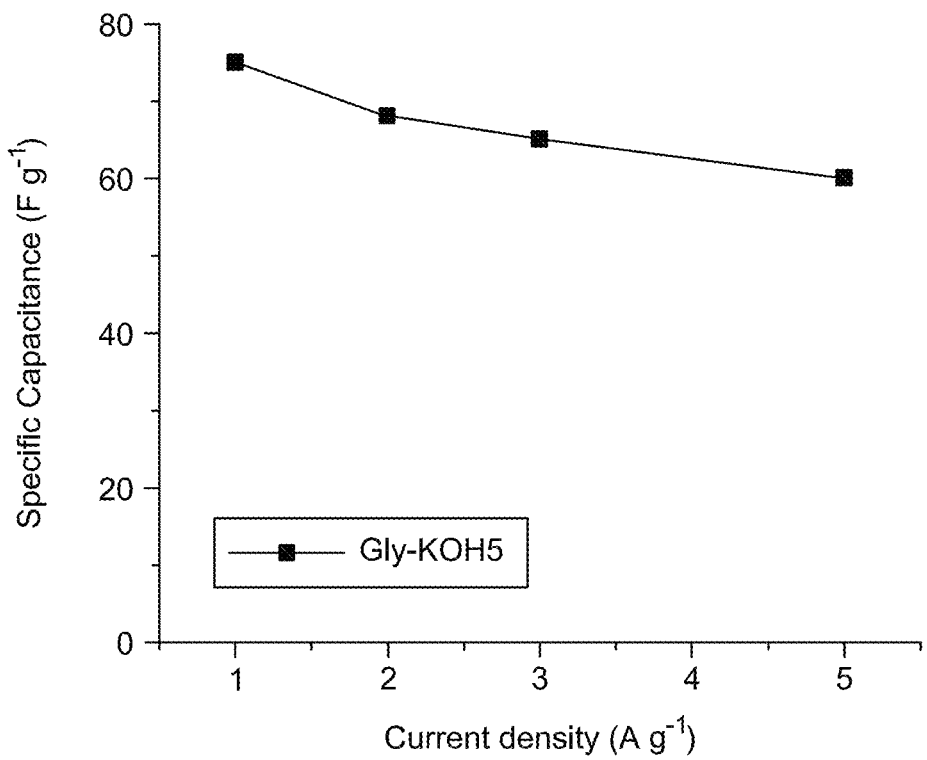
FIG. 8C shows specific capacitance of Gly-KOH5 based supercapacitor.
Figure 8D:
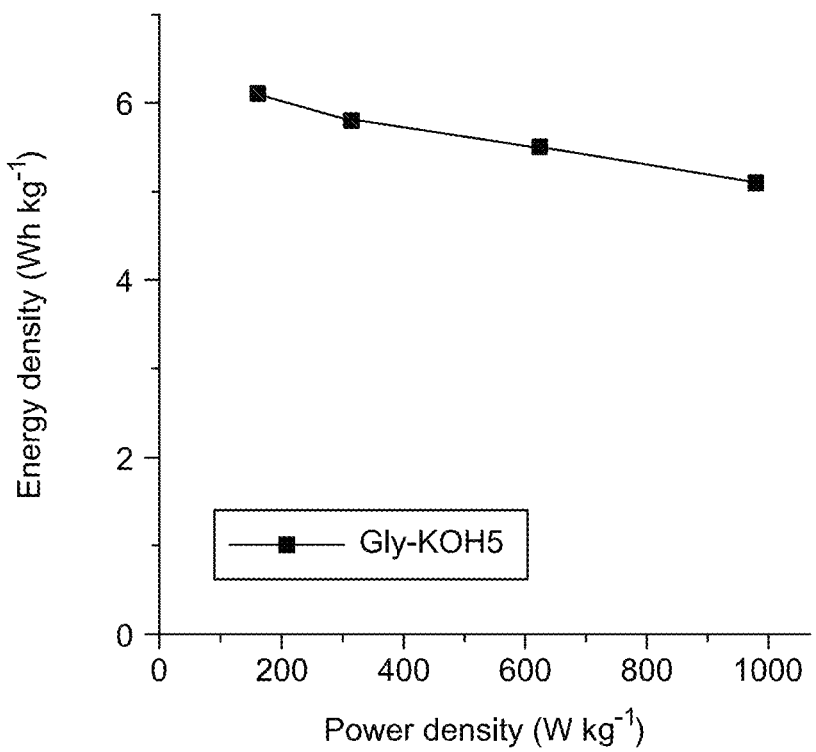
FIG. 8D shows Ragone plot of Gly-KOH5 based supercapacitor.

Referring to FIG. 3H, the electrochemical impedance spectroscopy measurements of the Mo-doped anhydrous electrolytes and the corresponding Nyquist graphs are illustrated. The ESR values for the Gly-KOH5-Mo3, Gly-KOH5-Mo5, Gly-KOH5-Mo10, and Gly-KOH5-Mo15 were determined from the x-axis intersections to be 56.3, 53.2, 46.2, and 48.8 ohm, respectively. The Warburg line in the low frequency region displays better ion diffusion characteristics compared to that of the Mo-free electrolytes. This is related to ion diffusion into the pores of the electrode via passing through the electrolyte [J. of Materials Chemistry A, 2014, 2, 2555$^{-2562}$ incorporated by reference herein in its entirety.]. The Rct values with the Gly-KOH5-Mo3, Gly-KOH5-Mo5, Gly-KOH5-Mo10, and Gly-KOH5-Mo15 are 17.50, 12.4, 7.3, and 9.4 ohm, respectively. The high internal resistance of the electrode was observed with low Mo concentration in electrolytes. The reason is ascribed to Mo-Gly complexation that results in lower mobility, limiting the diffusion of the ions onto the electrode surface. The internal resistance being lower for the electrodes with Gly-KOH5-Mo5 and Gly-KOH5-Mo10 indicates that the electrode-electrolyte interface offered a suitable pathway for faster diffusion. In addition, the ionic conductivity of the electrolytes was calculated using the Eq. S1 by the guidance of EIS results at room temperature. The results showed that an ionic conductivity of $3.0 \times 10^{-4}$ S cm$^{-1}$ for the Gly-KOH5-Mo10 system which exhibited the maximum specific capacitance among the other Gly-KOH—Mo based supercapacitors as shown in FIG. 7B.

Figure 4A:
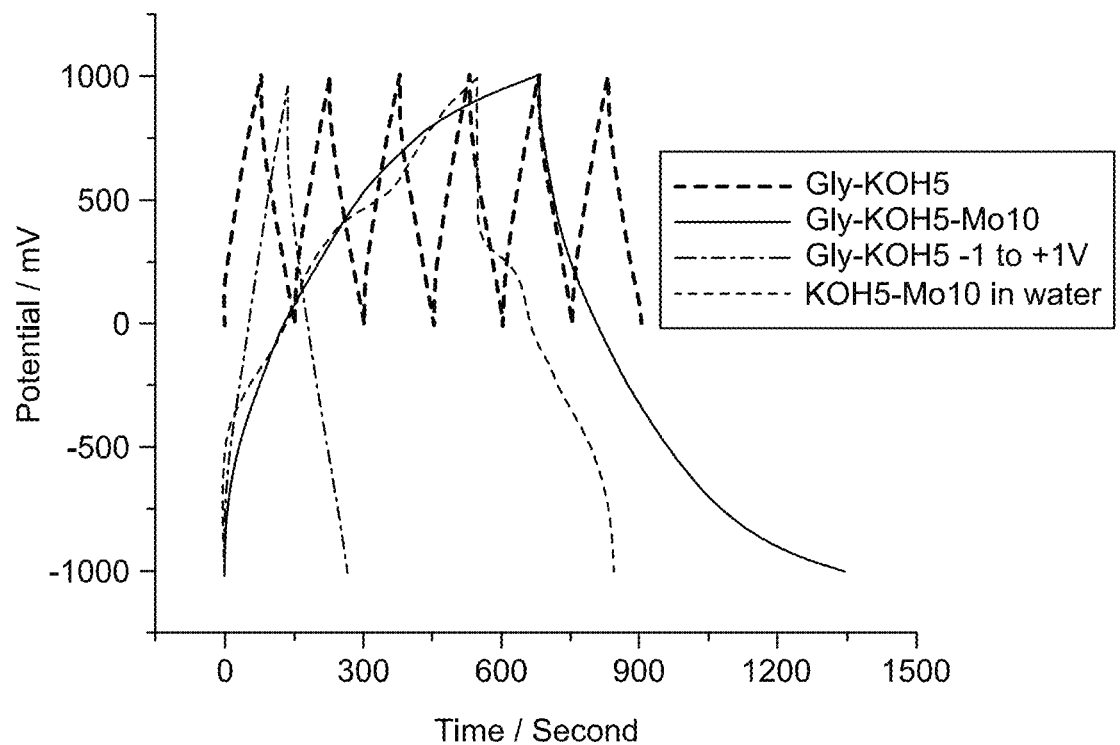
FIG. 4A shows comparison of the galvanostatic charge-discharge (GCD) profiles with Gly-KOH5 and Gly-KOH5-Mo10 at current densities from 1 A g$^{-1}$ to 5 A g$^{-1}$ in the voltage range of −1 to 1 V.

Performance Tests of Supercapacitors: A comparative GCD study was carried out for the devices having Gly-KOH5 and Gly-KOH5-Mo10 electrolytes as shown in FIG. 4A. The EDLC is studied by the typical GCD experiments at a current density of 1 mA within a voltage range of 0 to +1 V, because the Gly-KOH5 system does not contain a redox mediator. The voltage window $^{-1}$ to +1 V is applied to the devices contain redox-active electrolytes with Mo content (Gly-KOH5-MoX) and better comparison, the same window is applied to the Gly-KOH5 system. Results show that the supercapacitor with Gly-KOH5-Mo10 has at least seven times longer discharge time within the potential window of 0 to +1 V and at least four times longer discharge time within the potential window $-1$ to +1 V as compared to Gly-KOH5. A further GCD experiment was performed using the same concentration of KOH5 and Mo10 (without Gly) to reveal the contribution of the gel network (electrolyte) shown in blue line as shown in FIG. 4A. As expected, Mo peaks appeared more prominently, but high voltage drops, and lower capacitance are noticeable. The system containing Gly reveals much lower voltage drop, a stable character charge-discharge profile for longer cycles and high capacitance. The results show that the developed gel network structure contributes to ion transport, resulting in a more stable and high-performance electrolyte.

Figure 4B:
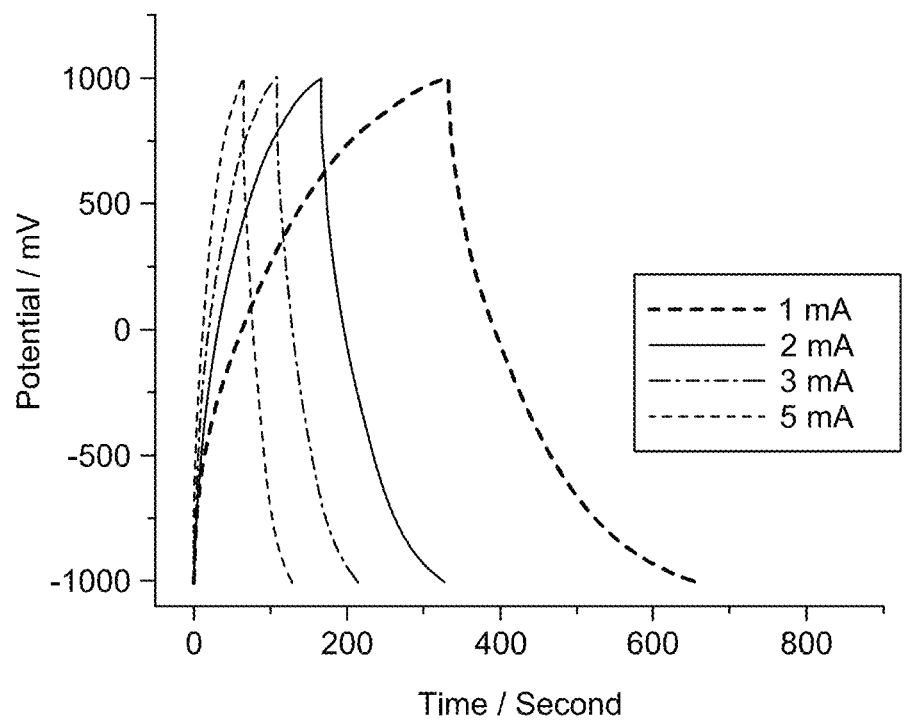
FIG. 4B shows GCD curves of Gly-KOH5-Mo3 at current densities from 1 A g$^{-1}$ to 5 A g$^{-1}$ in the voltage range of −1 to 1 V.
Figure 4C:
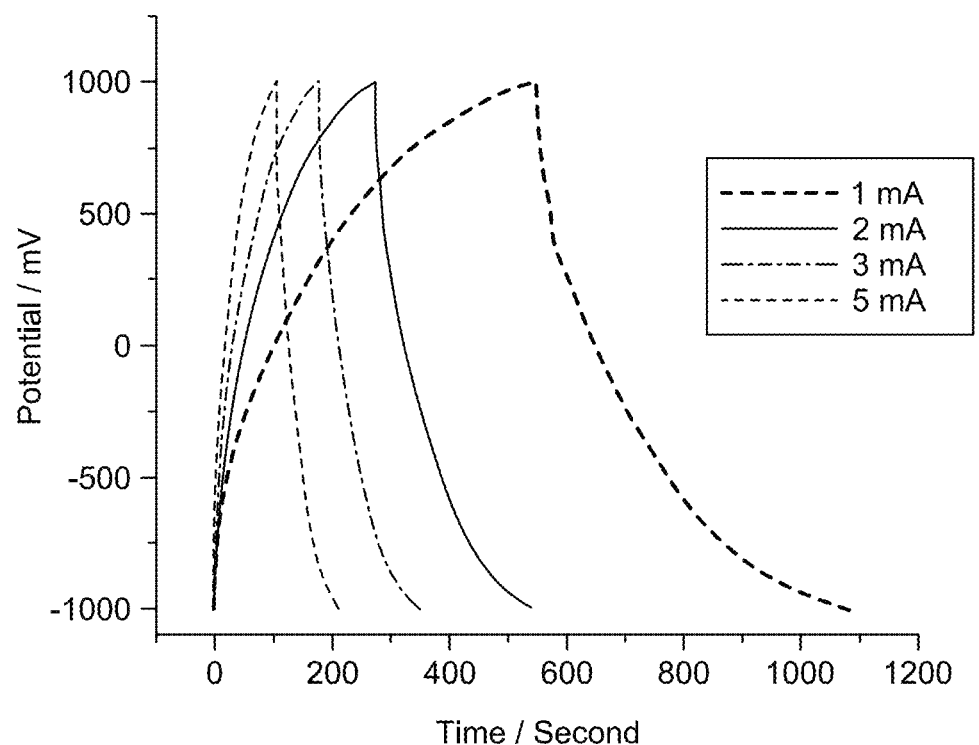
FIG. 4C shows GCD curves of Gly-KOH5-Mo5 at current densities from 1 A g$^{-1}$ to 5 A g$^{-1}$ in the voltage range of −1 to 1 V.
Figure 4D:
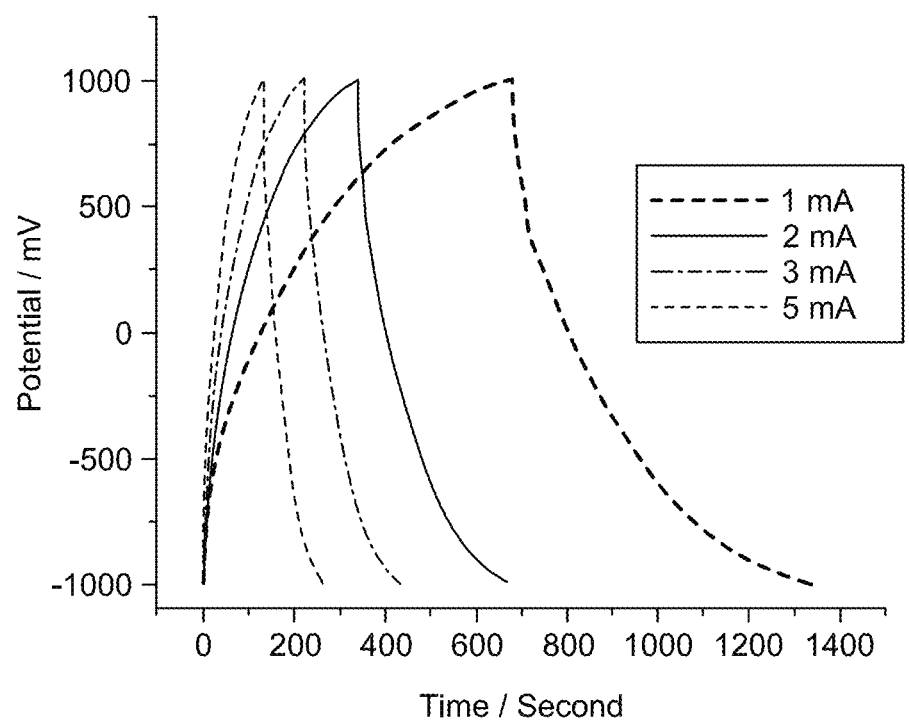
FIG. 4D shows CV profiles of Gly-KOH5-Mo10 at different scan rates in a potential range of 0 to +1 V.
Figure 4E:
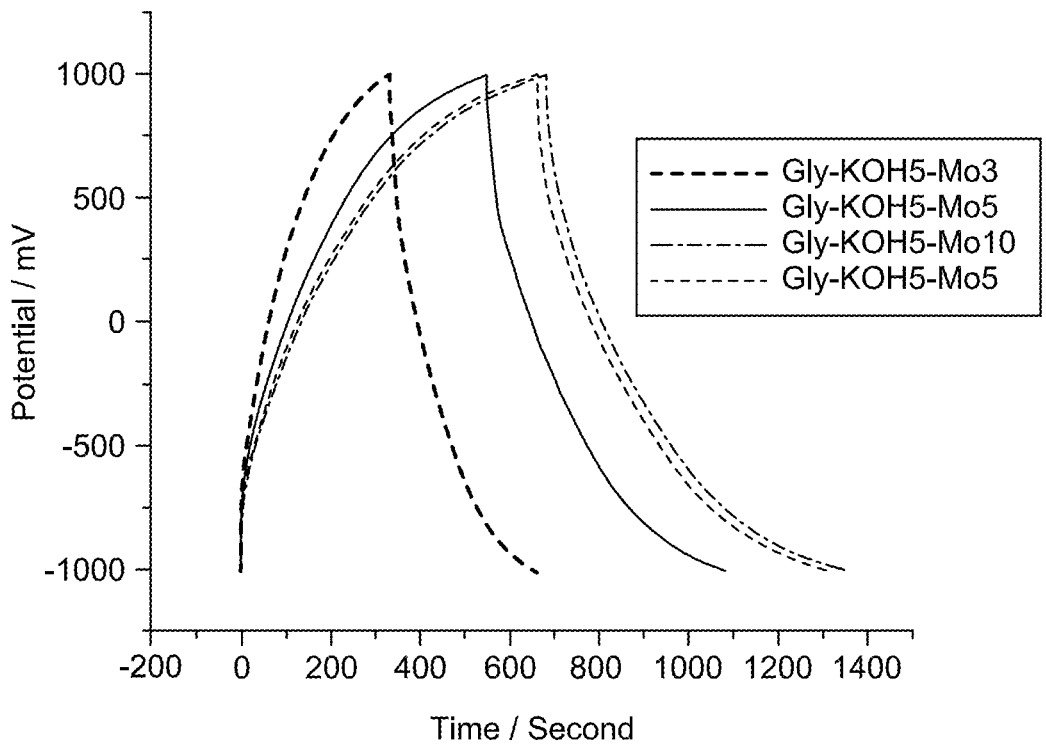
FIG. 4E shows GCD profiles at a current density of 1 A g$^{-1}$ for devices with Gly-KOH5-Mo3, Gly-KOH5-Mo5, Gly-KOH5-Mo10, and Gly-KOH5-Mo15.
Figure 9:
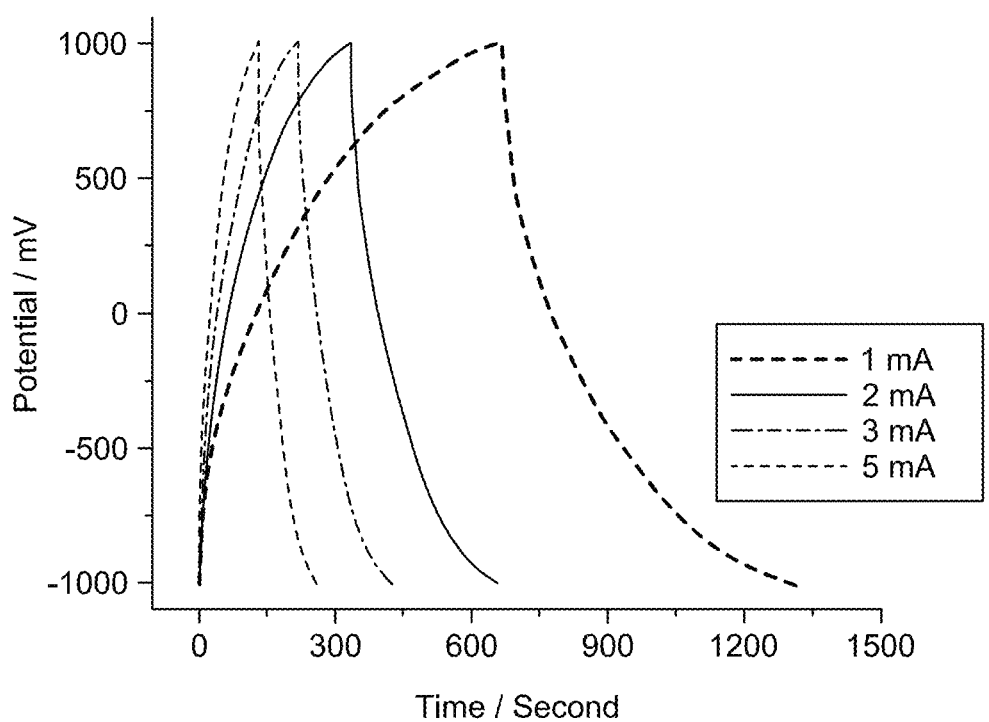
FIG. 9 shows GCD curves of Gly-KOH5-Mo15 at current densities from 1 A g$^{-1}$ to 5 A g$^{-1}$ in the voltage range of −1 to 1 V.

The EDLC and redox reactions of the Mo units in the anhydrous electrolyte dramatically increased the storage capability of the device. FIG. 4B-D show the rate capability of the devices (Gly-KOH5-Mo3, Gly-KOH5-Mo5, and Gly-KOH5-Mo10) (Gly-KOH5-Mo15 shown in FIG. 9 by applying GCD measurements at different current densities within 1 mA to 5 mA and the potential range of –1 V to +1 V. It is clear that the curves represent characteristic redox reactions of Mo, yielding different shapes in a way that is consistent with the CV profiles. Depending on the current density, the GCD curves varied in charge and discharge states and demonstrated that the devices can operate with high performance even at high current densities. FIG. 4E shows GCD profiles of the devices having electrolytes of Gly-KOH5-Mo3, Gly-KOH5-Mo5, Gly-KOH5-Mo10, and Gly-KOH5-Mo15 at the same current density of 1 mA. The capacity of the devices increased with increasing Mo content in Gly, reaching a maximum with Gly-KOH5-Mo10 and then stabilizing. This behavior could be explained by the concentrations of Gly and Mo reaching a threshold level above which complexation diminished the ion diffusion, reducing the capacitance in the device. Voltage drops of 114, 104, 93 and 97 V were obtained from the GCD profiles and the corresponding ESR values were calculated by the equation S8 and values match well with the data from EIS measurements.

Figure 4F:
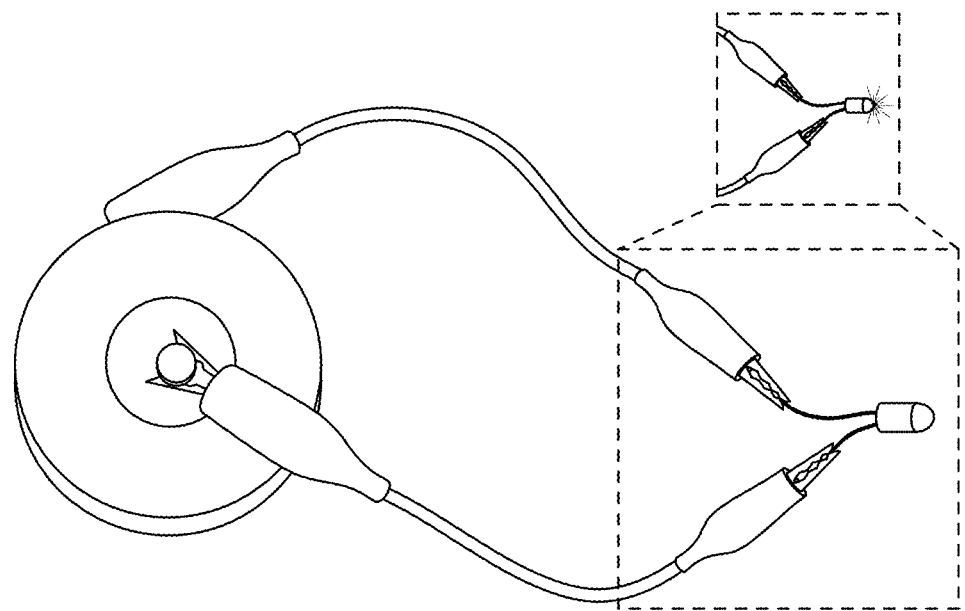
FIG. 4F shows digital photograph of a LED light powered by the supercapacitor with Gly-KOH5-Mo10.
Figure 4G:
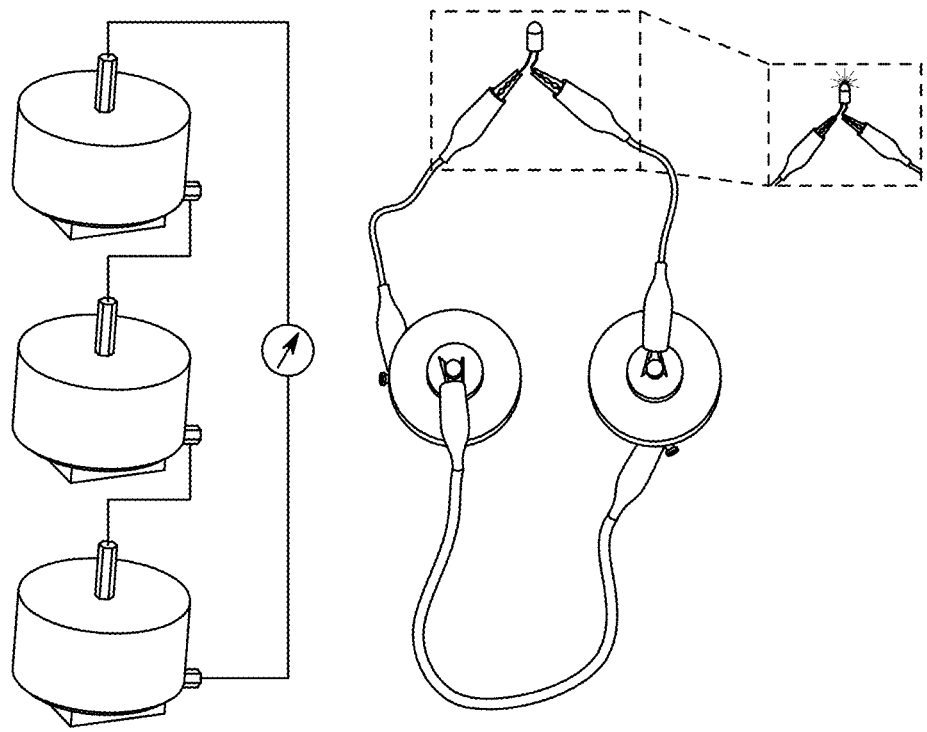
FIG. 4G shows schematic illustration and digital photograph of series connections of three cells with a circuit that powered an LED lamp.
Figure 4H:
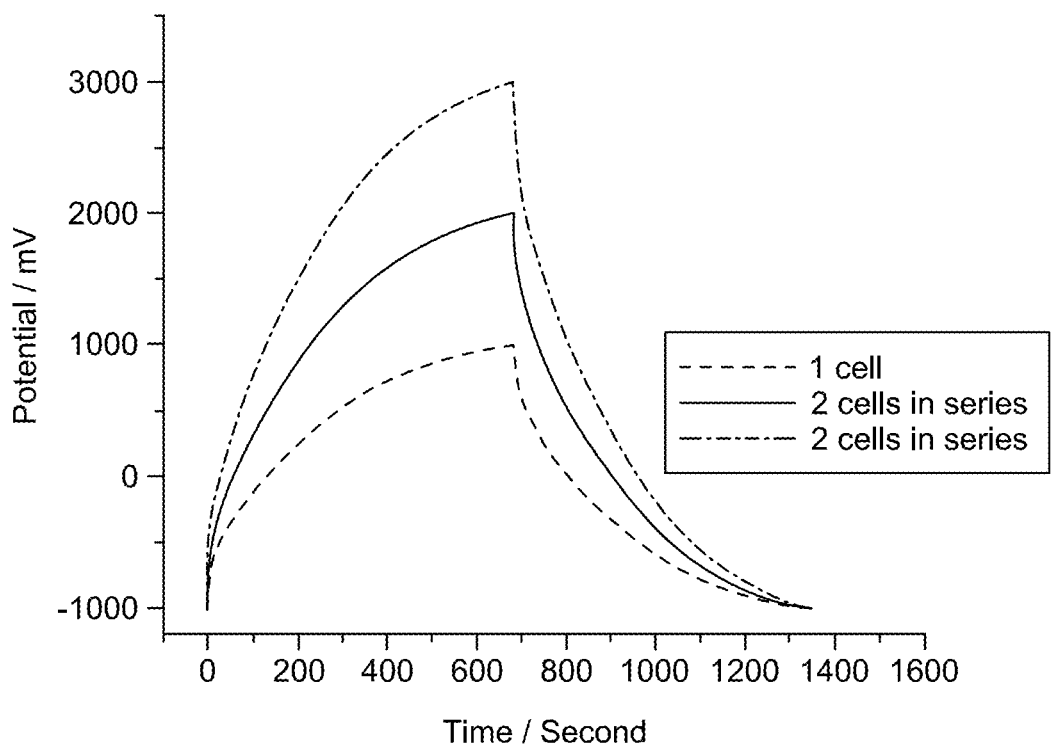
FIG. 4H shows GCD profiles of three cells connected in series at a current density of 1 mA.
Figure 4I:
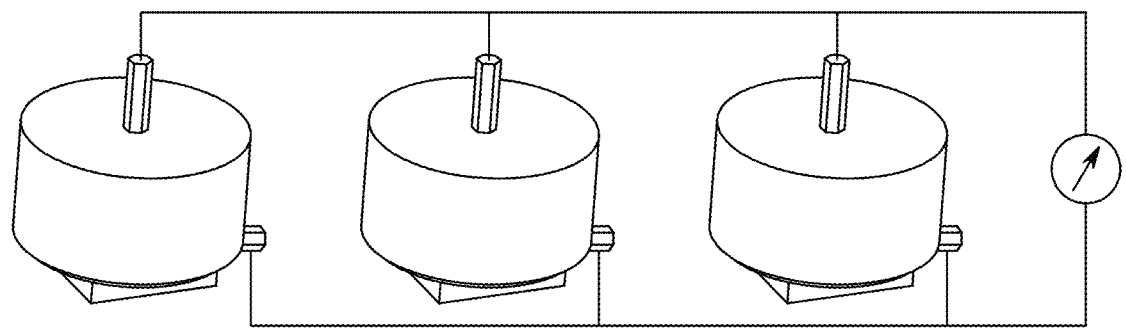
FIG. 4I shows schematic illustration of devices in parallel connection.
Figure 4J:
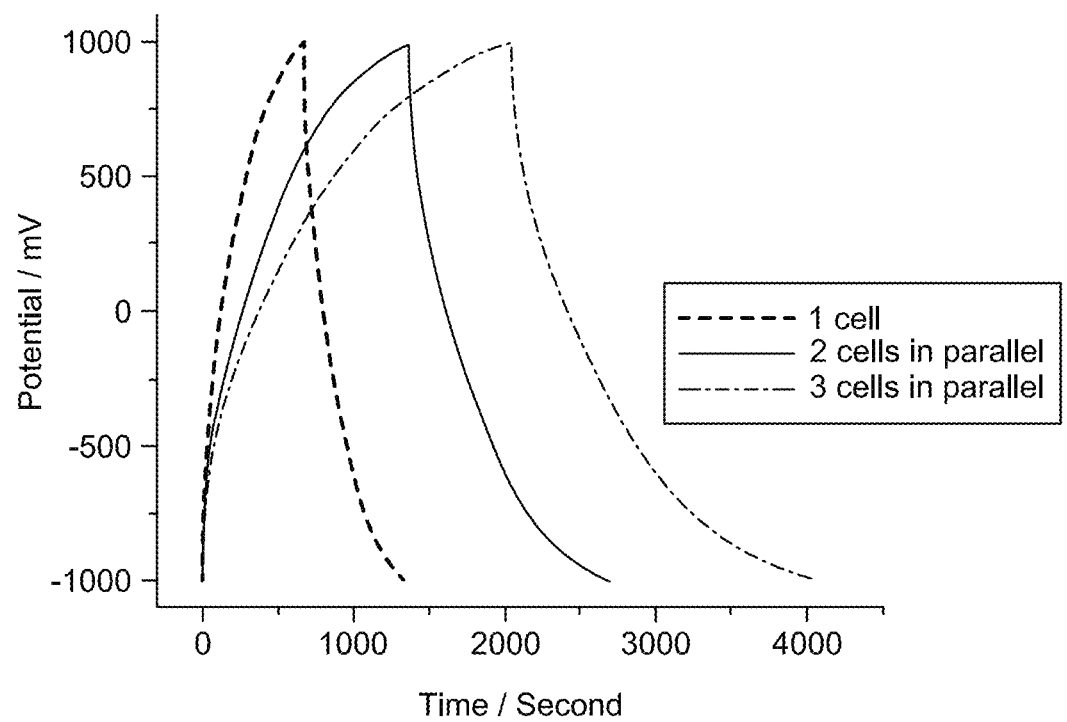
FIG. 4J shows GCD curves of the three cells with parallel connections.
Figure 10:
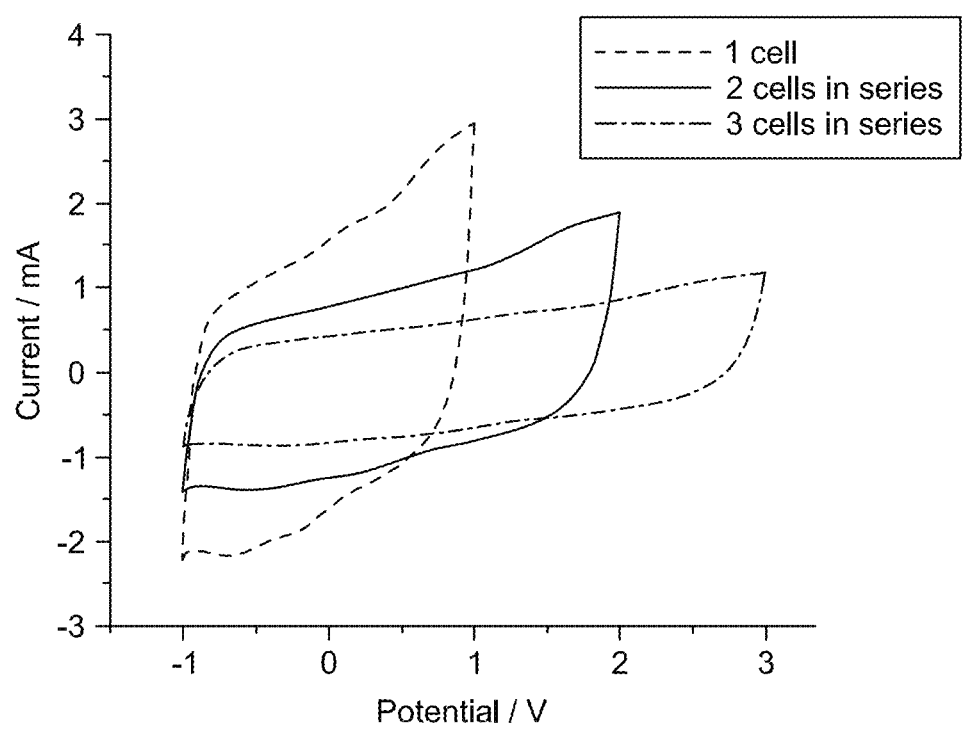
FIG. 10 shows CV of Gly-KOH5-Mo10 based devices in series connection.

FIG. 4F shows a photograph of an RBG (red-blue-green) color LED powered by the supercapacitor with Gly-KOH5-Mo10. A single cell successfully operated the LED; however, only red appeared among the RGB colors. The capacitance or output voltage can be easily increased by constructing the flexible devices in parallel or series. This configuration is due to the requirement of high specific energy density and power density for complex electronic applications. FIG. 4G shows a schematic and digital photograph of the series connection of three cells, and the green light seen reveals that the system generates high voltage in series connection. This is tested by GCD measurements with different series-connection devices that contain one, two, or three supercapacitors as shown in FIG. 4H. This is further confirmed by the CV measurements that the output potential linearly increased when three cells are connected in series and it reached up to 3 V shown in FIG. 10. The devices show increasing potentials from 1 V to 2 V, and then 3 V at 1 mA current density for the same GCD time. These results show that the devices are producing high voltage when connected in series. For the devices in parallel, the discharge time is doubled with two supercapacitors and approximately tripled for three supercapacitors, indicating an increase of capacitance.

Figure 5A:
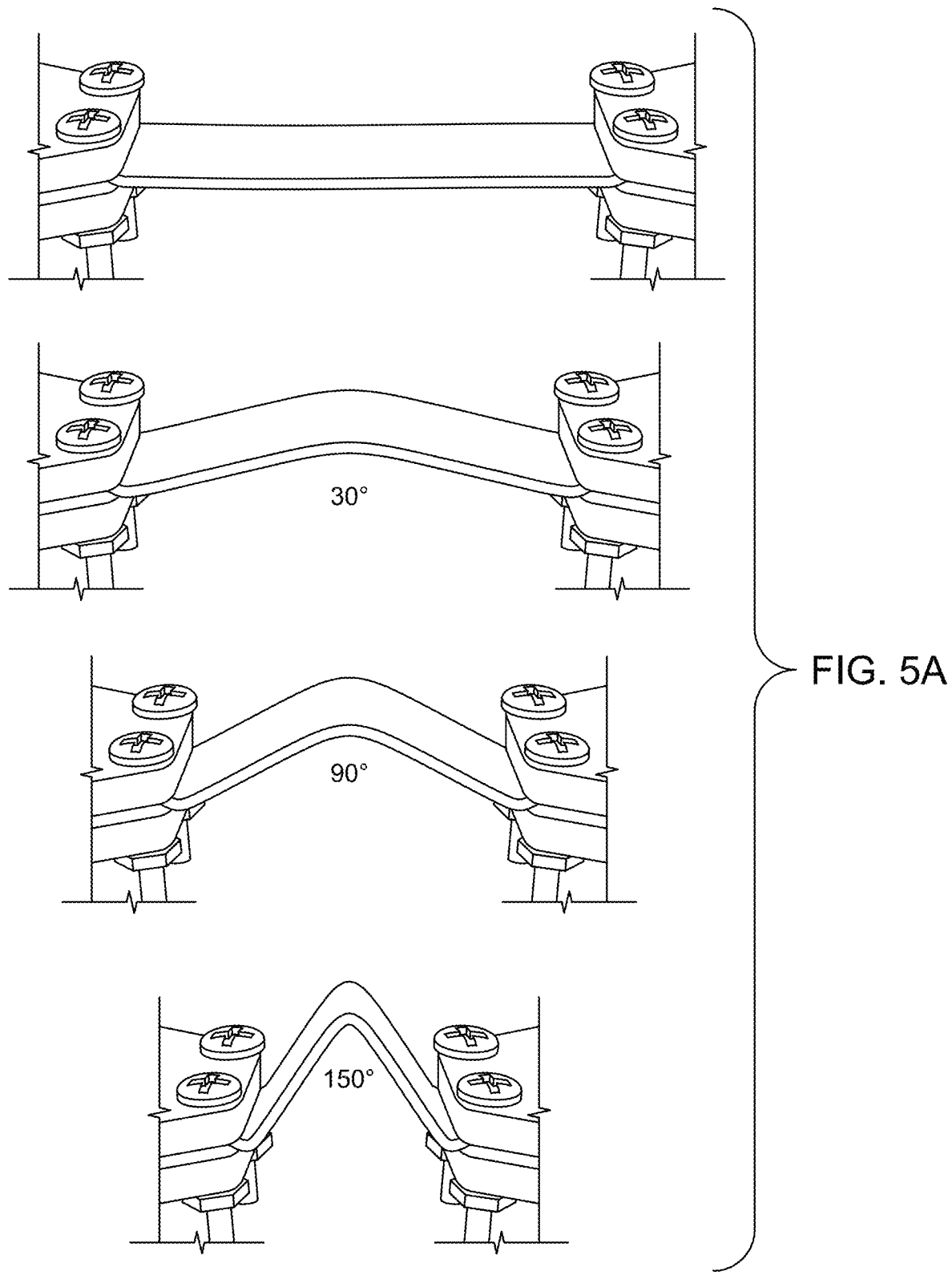
FIG. 5A represents photographs of supercapacitor and supercapacitors at bending angles of 30°, 90°, and 150°.
Figure 11:
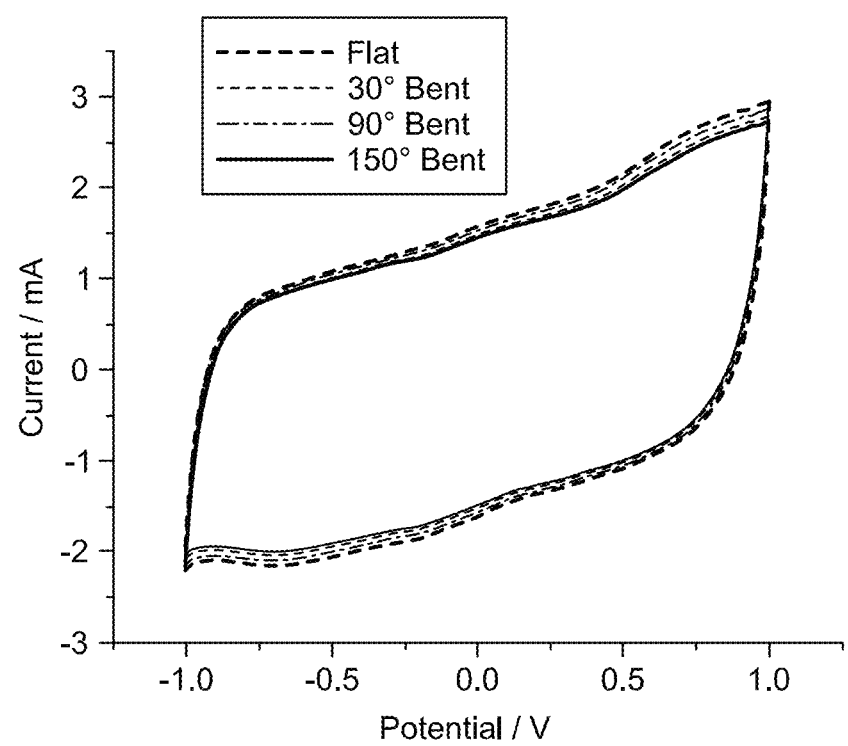
FIG. 11 shows CV of Gly-KOH5-Mo10 electrolyte-based device at different bending state (flat−30°$^{-90°-150°}$)

A robust, flexible and thin supercapacitor device is assembled using a Gly-KOH5 electrolyte between two CC-coated aluminum electrodes with a dimension of two 1.5 cm×4 cm. A heat resisting tape is used as supporting material to obtain such compact and flexible device as seen in the FIG. 5A. The flexibility of the Gly-KOH5-Mo-based supercapacitor was tested by GCD measurements upon different bending conditions (30°, 90°, and 150°), as displayed in FIG. 5A. Excellent GCD performance was obtained from the device at all bending angles starting from the free state to the 150° bend. This behavior was also confirmed by the CV of Gly-KOH5-Mo10 electrolyte-based device at different bending state (flat, 30°, 90°, and 150°) as shown in FIG. 11.

Figure 5B:
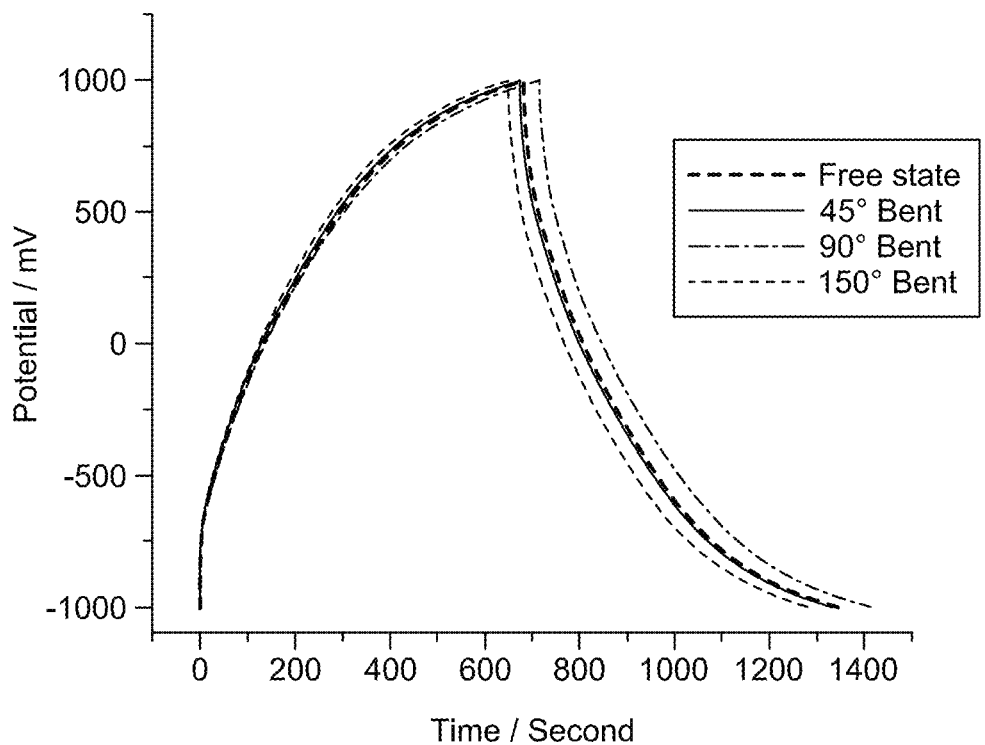
FIG. 5B shows GCD profiles under different bending angles.
Figure 5C:
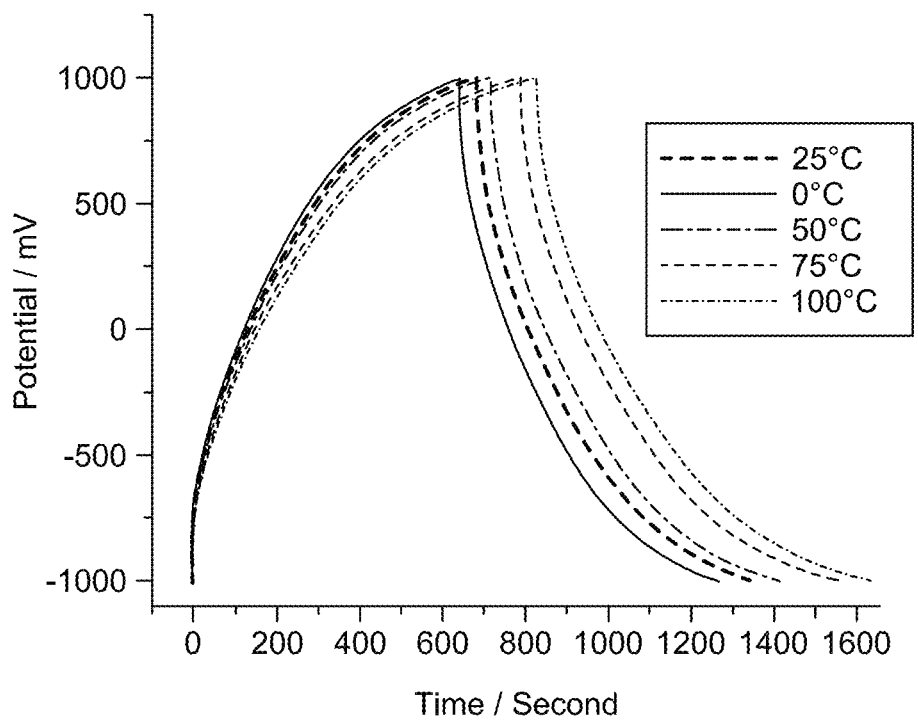
FIG. 5C shows GCD profiles under temperatures of 0° C., 25° C., 50° C., and 100° C.
Figure 12:
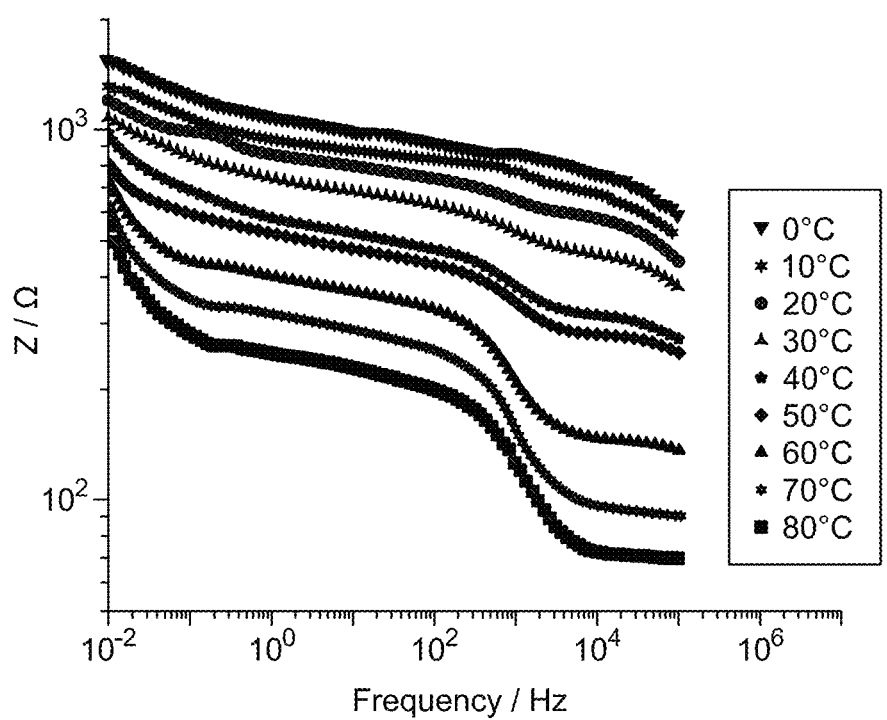
FIG. 12 shows the resistivity tests of Gly-KOH5-Mo10 electrolyte-based device at different temperatures.

The profiles of GCD curves maintain the initial form (at free state), and a negligible change was observed in the capacitance values, indicating the supercapacitors have high mechanical robustness as shown in FIG. 5B. The temperature dependent resistances vs. frequency (Hz) of the supercapacitor was studied under a broad temperature range between 0° C. and 100° C. The resistivity profile shows that the Gly-KOH—Mo10 gel electrolyte has excellent freezing resistance, with excellent performance even when the temperature drops to 0° C. as shown in FIG. 12. The temperature stability of the electrolyte was further confirmed by the GCD tests shown in FIG. 5C. The capacitance showed a minimal decrease at low temperature (0° C.), while it increased significantly at higher temperatures. This indicates that the material keeps its performance as gel electrolyte without changing the high ion diffusion character at low temperature. More importantly, the increase in GCD profiles was observed with the gradual increase in temperature. When the temperature reached 100° C., the capacitance value shows a 20% enhancement, which did not affect the mechanical performance of the system with high ion diffusion at high temperatures.

Figure 5D:
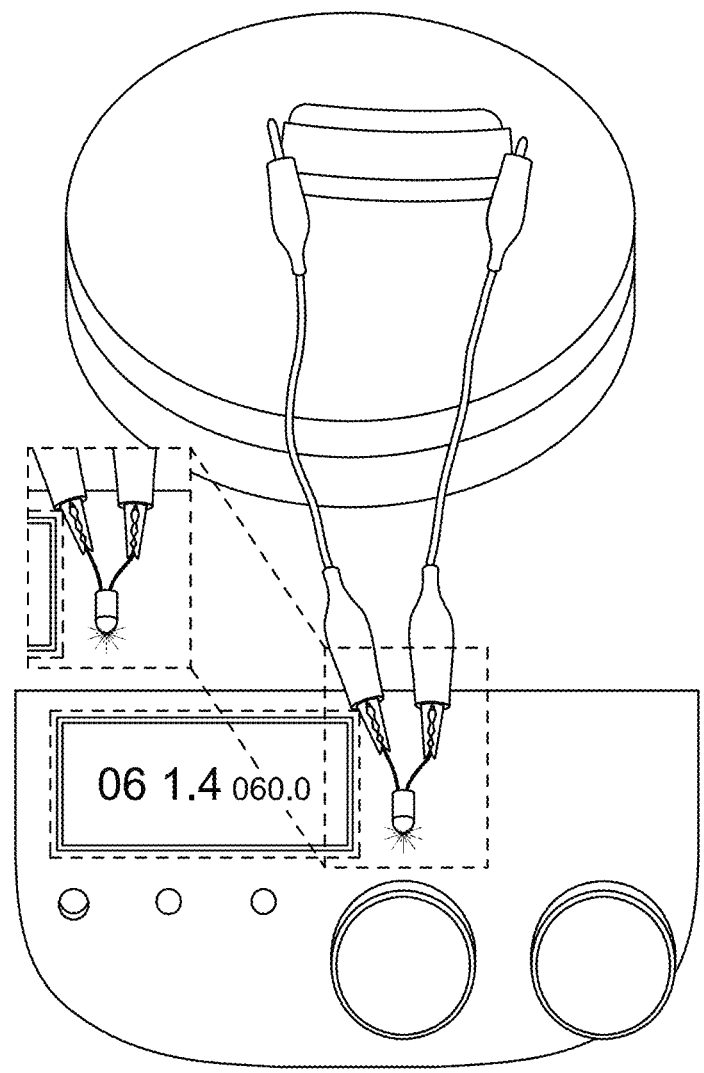
FIG. 5D shows photograph of supercapacitor device at 60° C. while operating an LED.
Figure 5E:
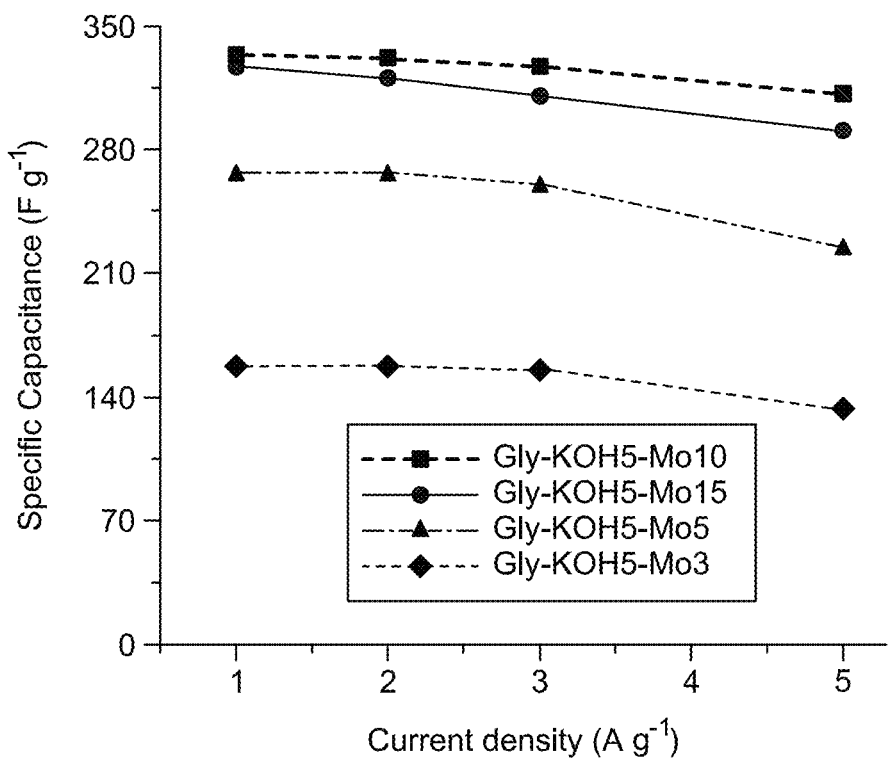
FIG. 5E shows specific capacitance of the Mo3-, Mo5-, Mo10-, and Mo15-containing Gly-KOH5 gel electrolyte.
Figure 5F:
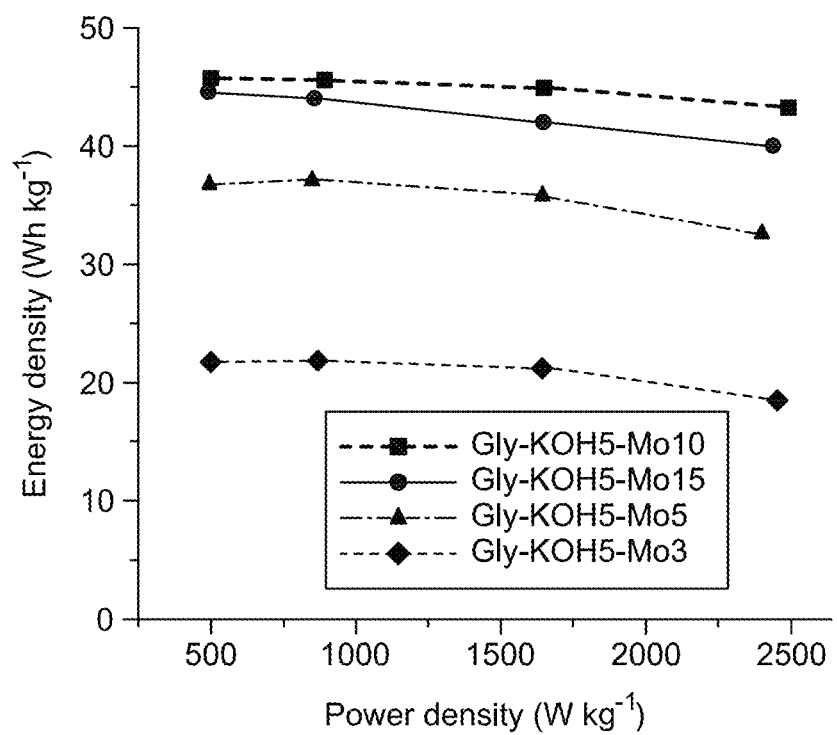
FIG. 5F shows Ragone plots of the Mo3-, Mo5-, Mo10-, and Mo15-containing Gly-KOH5 gel electrolyte.
Figure 13:
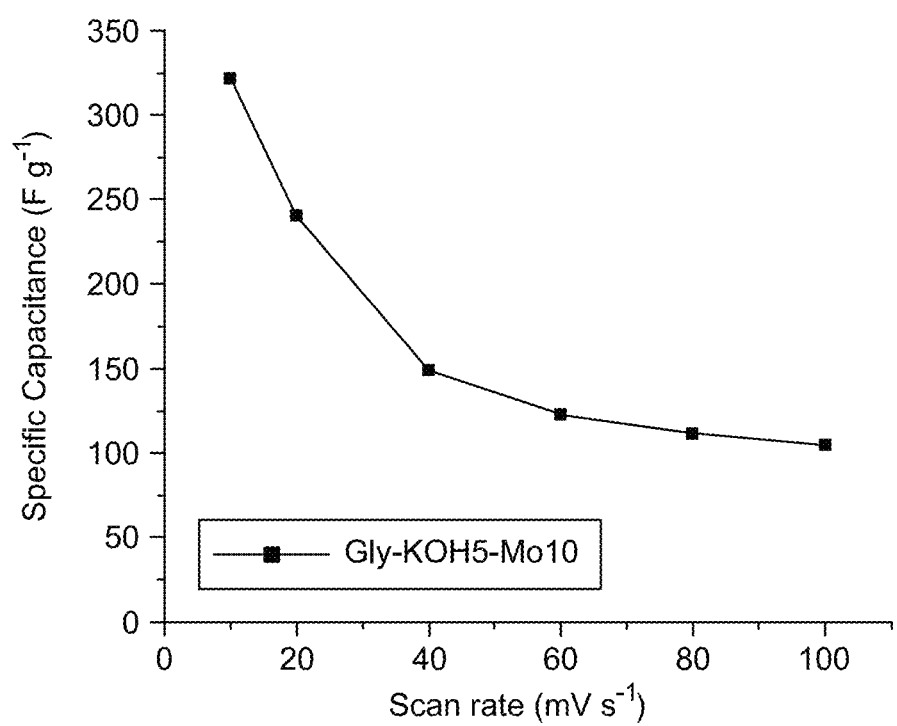
FIG. 13 shows the gravimetric capacitances measured at different scan rates.

A temperature test of the supercapacitor when operating the LED is shown in FIG. 5D. The specific capacitances of the Gly-KOH—MoX based supercapacitors were determined at different current densities (1, 2, 3, and 5 mA) to show the rate capability as shown in FIG. 5E. The interconnected Gly-MoX networks and abundant molybdate active regions improved the ion transport channels through the activated carbon electrode, as evidenced by the superior specific capacitance behavior even at high current densities. The Gly-KOH5-Mo10 device achieved a favorable specific capacitance of 328 F $g^{-1}$ at a current density of 1 A $g^{-1}$, which is remarkably higher than that of the Mo-free Gly-KOH5 (75 F $g^{-1}$) seen in FIG. 8C, Gly-KOH5-Mo5 (266 F $g^{-1}$), and Gly-KOH5-Mo3 (157 F $g^{-1}$) based devices seen in FIG. 5E. The capacitance (328 F $g^{-1}$) obtained by the GCD is well agreed with the capacitance obtained from the CV (324.2 F $g^{-1}$) at 10 mV $s^{-1}$ shown in FIG. 13. Energy and power density values of the Gly-KOH—MoX based devices were calculated from the GCD curves depicted in FIG. 5F. The Gly-KOH5-Mo10 device reached a superior energy density of 45.6 Wh/kg at a power density of 497 W/kg. At high discharge rate (5 A $g^{-1}$), the supercapacitor achieves an energy density of 43.5 Wh/kg at a power of 2450 W/kg, demonstrating high performance even at high rates.

Figure 5G:
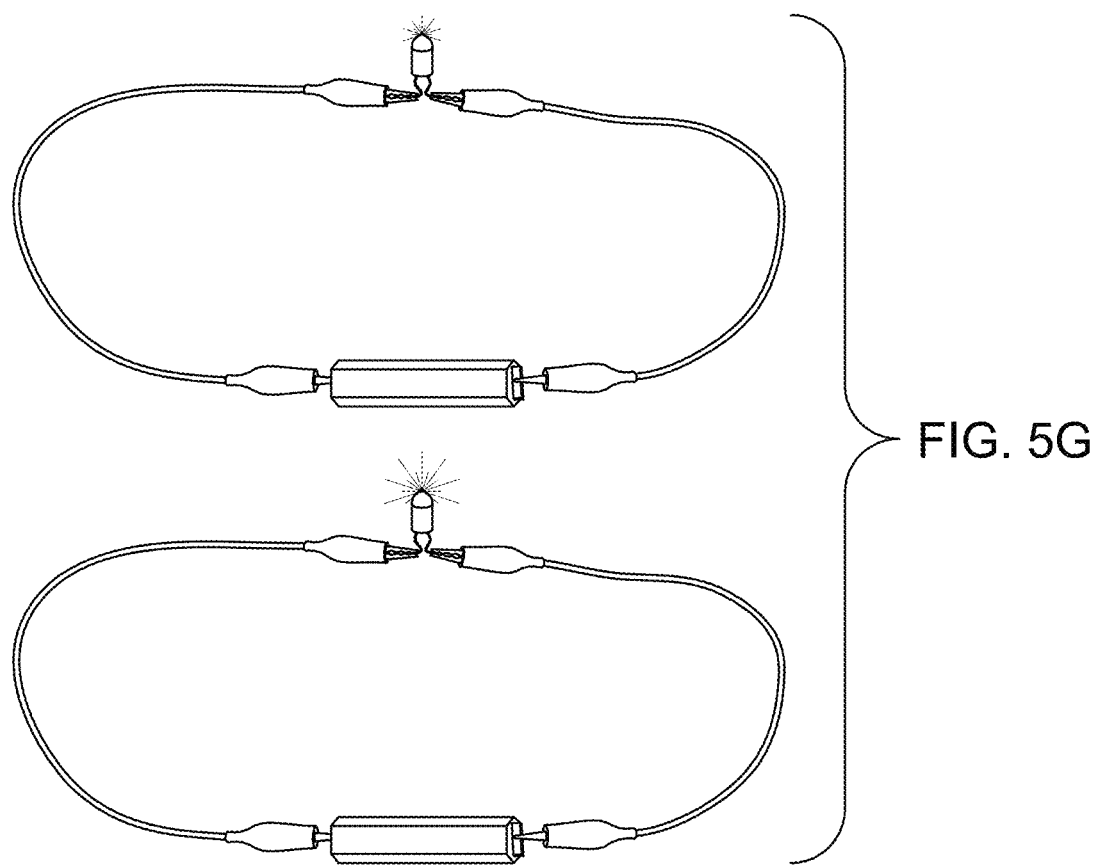
FIG. 5G shows Images of supercapacitor device when operating the RBG color LED.
Figure 5H:
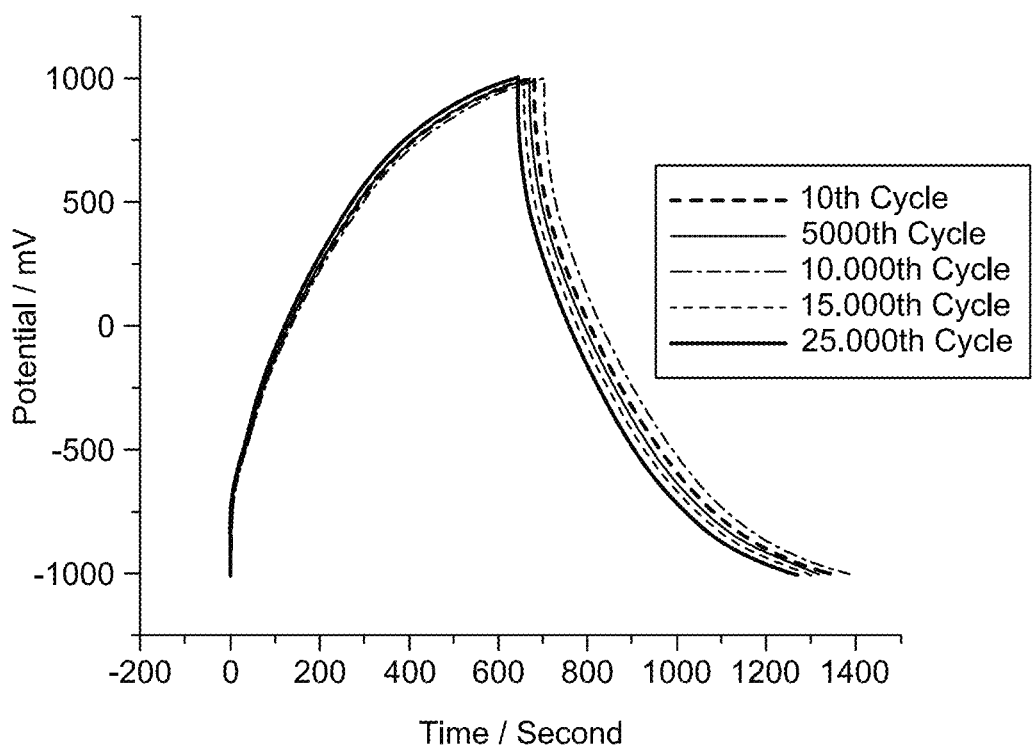
FIG. 5H shows GCD profiles measured at different cycle numbers.
Figure 5I:
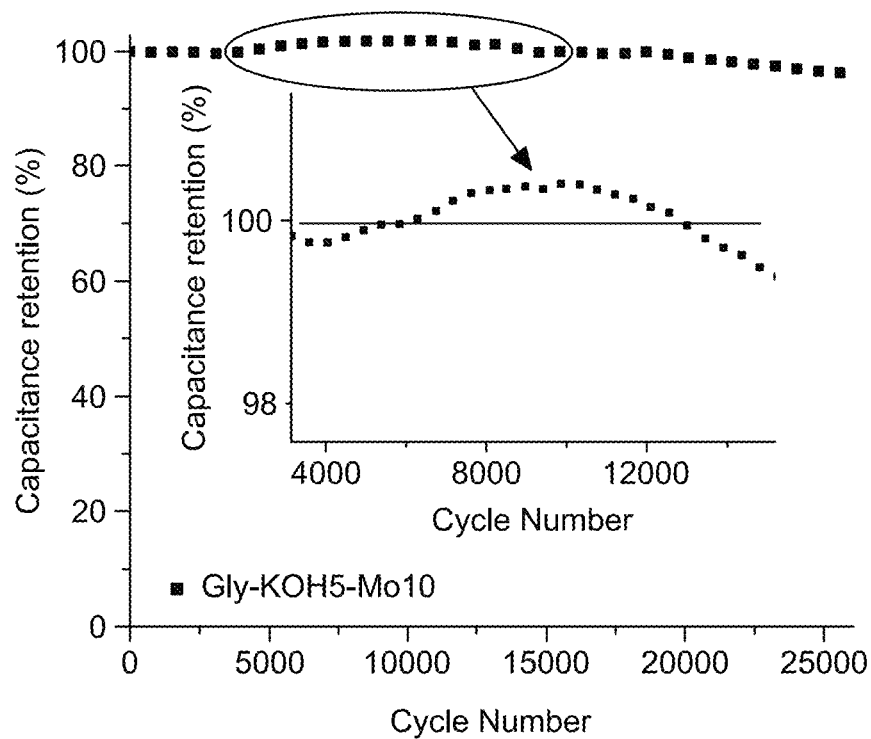
FIG. 5I shows cycle performance of Gly-KOH5-Mo10-based supercapacitor at 1 mA current density.
Figure 14A:
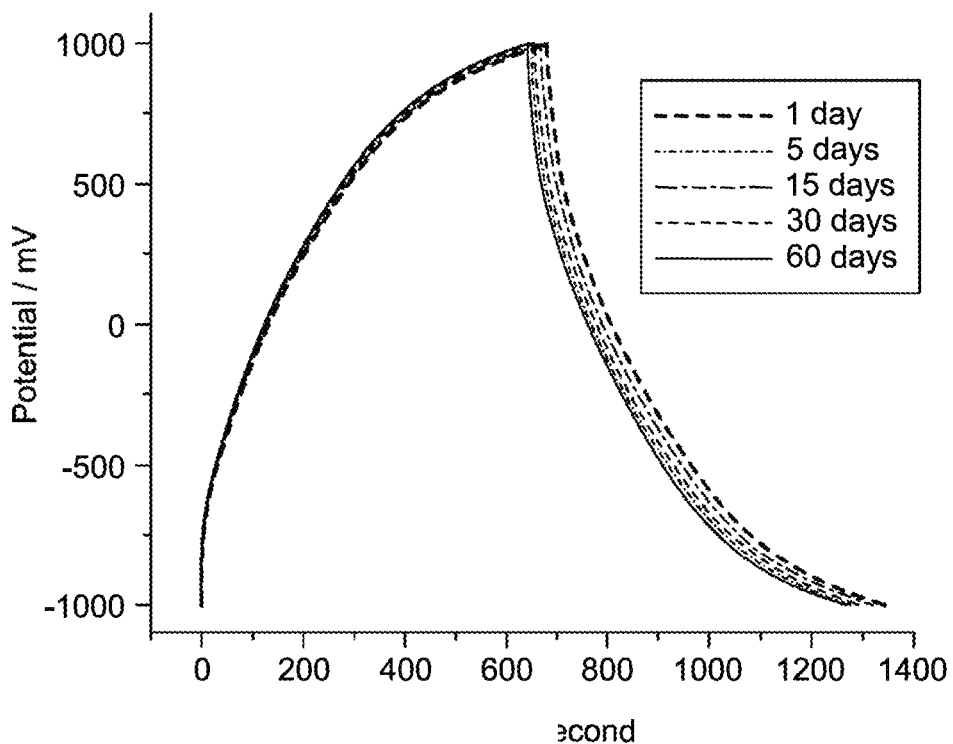
FIG. 14A shows the stability test of Gly-KOH5-Mo10 electrolyte-based device.
Figure 14B:
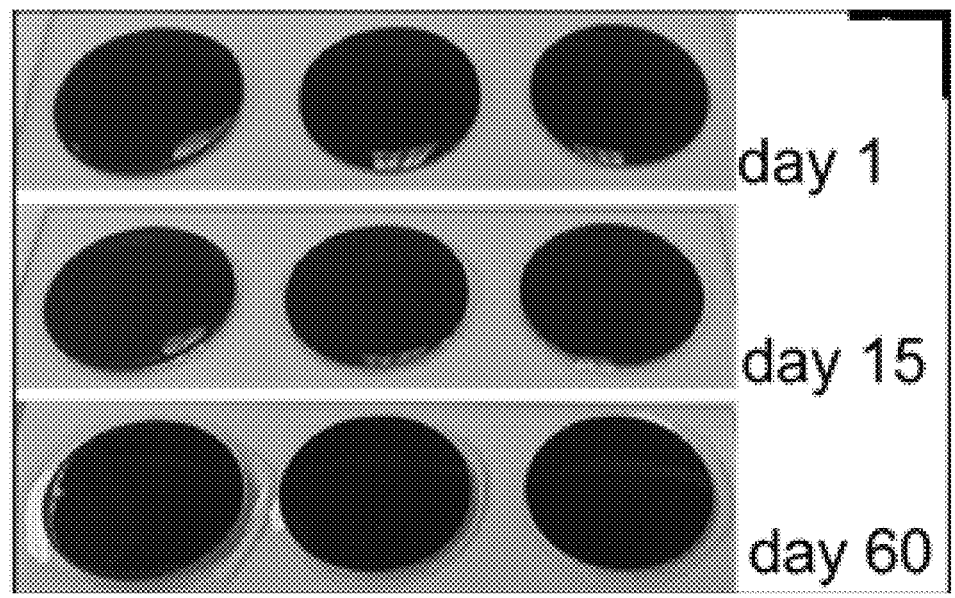
FIG. 14B shows the stability test of Gly-KOH5-Mo10 electrolyte at room temperature (open atmosphere)
Figure 15:
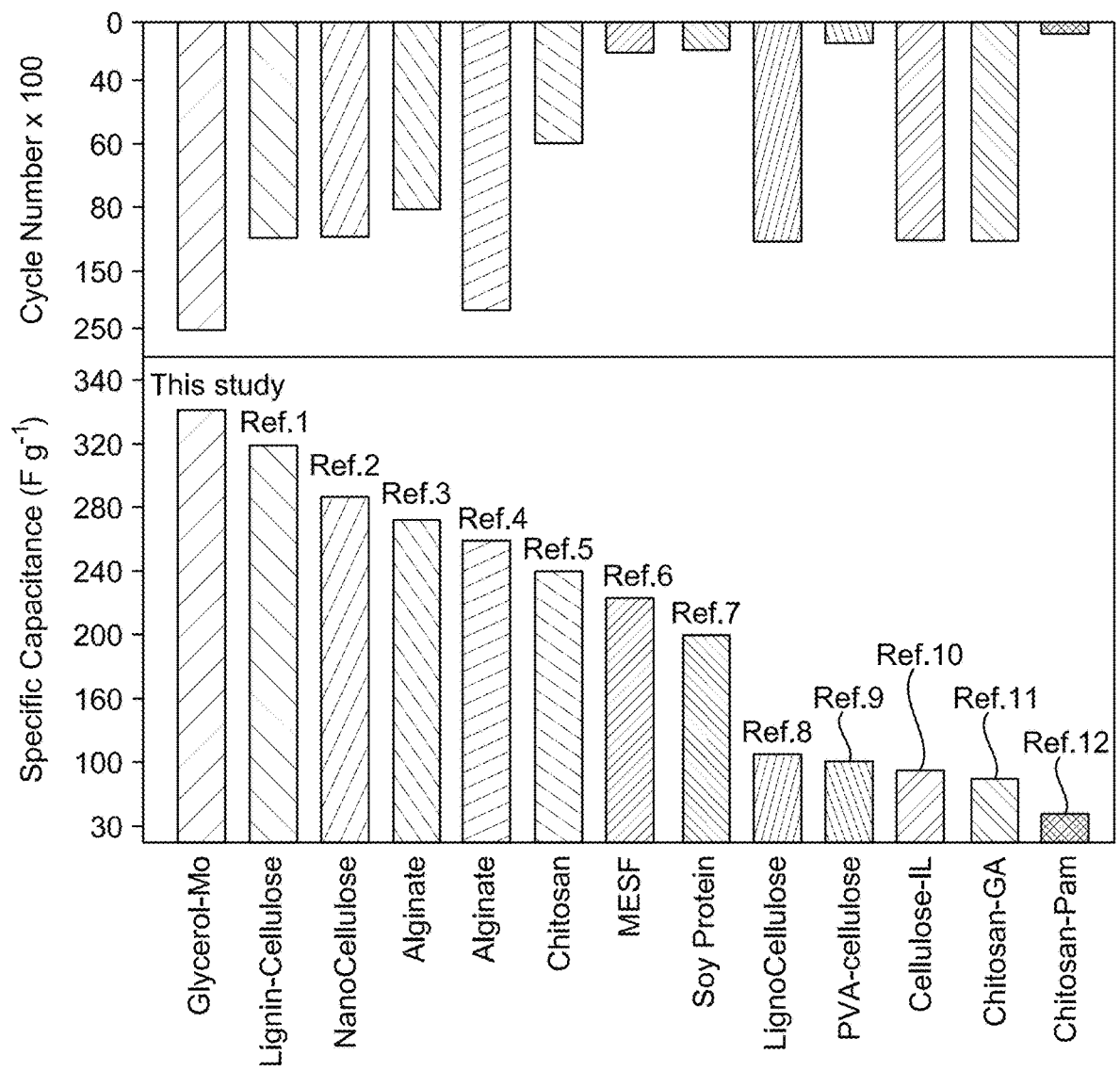
FIG. 15 shows performance comparison of the bio-electrolyte based supercapacitors.

Real applications of the flexible supercapacitors with dimensions of 1.5 cm×4 cm were demonstrated with an RGB color LED as shown in FIG. 5G. The GCD measurements were obtained to test the durability of the fabricated flexible devices at a current density of 1 mA shown in FIG. 5H. High cyclic durability performance was achieved by the same device, maintaining 100% GCD profile even after 15,000 cycles. The specific capacitance value of 325 F $g^{-1}$ after the 15,000 cycles also demonstrated an extraordinary cyclic performance. In addition, the fabricated device demonstrated excellent stability after 25,000 cycles maintaining its 96% of initial performance. Furthermore, the same device showed a superior long-term stability in a period of 60 days as seen in FIG. 14A and the stability of the electrolyte was also tested at room temperature for a period of 30 days shown in FIG. 14B. FIG. 5I shows the cyclability performance of the Gly-KOH5-Mo10 supercapacitor, and the inset shows the section between cycle numbers 4000 and 12,000. The efficiency of the device was observed to increase when it reaches around 6000 cycles, and this behavior continues until it reaches 12,000 cycles. This finding can be explained by the absorption of glycerol on the surface via hydrogen bonding that provides more hydroxyl groups for ion exchange. The increase in the number of ion diffusion channels from the hydroxyl groups resulting in more redox reactions improving the charge storage capability [J. The Electrochemical Society, 2012, 159, A843-A847, incorporated by reference herein in its entirety]. In this way, the device achieves extraordinarily high performance for 25,000 GCD cycles with a limited capacitance loss of 4%. FIG. 15 illustrates a comparison of the cyclic performances as well as specific capacitances of the devices, including Gly-KOH5-Mo10 and other bio-inspired supercapacitor systems. As illustrated, the supercapacitor with Gly-KOH5-Mo10 electrolyte demonstrated excellent specific capacitance and cycling performance compared to previous reports.

The ionic conductivities of the electrolytes were calculated using the Eq. S1 at room temperature;

$$\sigma(S/cm) = L(cm)/R(\Omega) \times A(cm^2) \quad (S1)$$

where $\sigma$ is conductivity, L is electrode thickness, A is surface area and R is resistivity.

Resistivity of the electrodes were obtained from the electrochemical impedance (EIS) measurements.

The specific capacitance of the single electrode (Cs, single) and whole cell (Cs,cell) were calculated with Eqs. S2 and S3 within the current density from 1 to 5 A g$^{-1}$:

$$Cs,single = 4I\Delta t/w\Delta V \quad (S2)$$

$$Cs,cell = I\Delta t/w\Delta V \quad (S3)$$

where $\Delta t$, $\Delta V$, w, and I correspond to the discharge time, voltage difference in discharge, total weight of both electrodes and redox active species, and discharge current, respectively.

The specific pseudocapacitance for the devices shows non-linear profiles have been evaluated using the equation (S4) and (S5).

$$Cs,cell = I\int Vdt/w\times\Delta V \quad (S4)$$

where $\int Vdt$ is the area under the discharge curve (GCD curve), $\Delta V$ operating voltage range; initial voltage-final voltage.

$$Cs,cell = \int Idv/v\times w\times\Delta V \quad (S5)$$

where $\int Idv$ is the area between the forward and reverse scan of CV curve, v is the scan rate.

Supercapacitor energy and power densities were assessed by Eqs. S6 and S7:

$$E = \tfrac{1}{8}\times Cs\times(\Delta V^2)/3.6 \quad (S6)$$

$$P = E\times(3600/\Delta t) \quad (S7)$$

where $\Delta V$ is the voltage window, $\Delta t$ is discharge time, E is energy density, and P is power density.

$$R_{ESR} = V_{drop}/2I \quad (S8)$$

$R_{ESR}$ is the equivalent internal resistance of the device which can be calculated from the voltage drop ($V_{drop}$) during the discharge process using the equation S8.

As seen from the TG thermograms shown in FIG. 6, there is no weight change up to 150° C. and then a weight loss starts due to evaporation of Gly [J. of Materials Chemistry A, 2014, 2]. The onset of degradation is 175° C. with a large mass loss that ended at 300° C. Clearly, the thermal stability of the anhydrous electrolytes slightly increased with Mo content and all materials has promising stability for broad temperature supercapacitor applications.

Numerous modifications and variations of the present invention are possible in light of the above teachings. It is therefore to be understood that within the scope of the appended claims, the invention may be practiced otherwise than as specifically described herein.

The invention claimed is:

1. A flexible energy storage device, comprising:
a pair of electrodes separated by a gel electrolyte, the gel electrolyte comprising glycerol, redox-active molybdenum-containing ions, and a secondary ionic substance, wherein the flexible energy storage device retains greater than 75% of an unbent energy storage capacity when bent at an angle of 10 to 170°.

2. The flexible energy storage device of claim 1, wherein the glycerol is present in an amount of 40 to 98 wt %, based on a total weight of gel electrolyte.

3. The flexible energy storage device of claim 1, wherein the redox-active molybdenum-containing ions are present in an amount of 1 to 25 wt %, based on a total weight of gel electrolyte.

4. The flexible energy storage device of claim 1, wherein the redox-active molybdenum-containing ions are molybdate anions.

5. The flexible energy storage device of claim 1, wherein the secondary ionic substance is present in an amount of 1 to 35 wt %, based on a total weight of gel electrolyte.

6. The flexible energy storage device of claim 1, wherein the secondary ionic substance is at least one selected from the group consisting of a hydroxide salt, a halide salt, a sulfate salt, a nitrate salt, a perchlorate salt, a tetrafluoroborate salt, a difluoro(oxalato)borate salt, a hexafluorophosphate salt, and a bis(trifluoromethanesulfonyl)imide salt.

7. The flexible energy storage device of claim 1, wherein the secondary ionic substance is an alkali metal hydroxide.

8. The flexible energy storage device of claim 7, wherein the alkali metal hydroxide is potassium hydroxide.

9. The flexible energy storage device of claim 1, wherein the gel electrolyte is substantially free of water.

10. The flexible energy storage device of claim 1, wherein the gel electrolyte is substantially free of polymer additives.

11. The flexible energy storage device of claim 1, wherein the gel electrolyte has a density of 1.4 to 1.9 g/cm$^3$.

12. The flexible energy storage device of claim 1, wherein the gel electrolyte has an ionic conductivity of $2.3\times10^{-4}$ to $3.2\times10^{-4}$ Scm$^{-1}$.

13. The flexible energy storage device of claim 1, wherein one or both of the electrodes are carbon electrodes.

14. The flexible energy storage device of claim 1, wherein the energy storage device is a supercapacitor, a fuel cell, or a battery.

15. The flexible energy storage device of claim 14, wherein the flexible energy storage device is a supercapacitor having a specific capacitance of 275 to 350 F/g.

16. The flexible energy storage device of claim 14, wherein the flexible energy storage device is a supercapacitor having an energy density of 40 to 50 Wh/kg.

17. A method of forming the flexible energy storage device of claim 1, the method comprising:
- mixing the secondary ionic substance and the glycerol at 25 to 75° C. to produce an ion-containing mixture;
- adding to the ion-containing mixture a salt comprising the redox-active molybdenum-containing ions to form an uncured gel;
- vacuum-drying the uncured gel to form the gel electrolyte;
- disposing the gel electrolyte on a first electrode such that the gel electrolyte forms a uniform film covering an entirety of a top surface of the first electrode; and
- placing onto the gel electrolyte a second electrode such that the second electrode is separated from the first electrode by the gel electrolyte to form the flexible energy storage device.

18. The method of claim 17, wherein one or both of the electrodes are carbon electrodes prepared by uniformly depositing on a conductive electrode support a film comprising activated carbon, conductive carbon, and a binder such that an entirety of a top surface of the conductive electrode support is individually covered by the film to form a carbon electrode.

19. A gel electrolyte, comprising:
- 40 to 98 wt % glycerol;
- 1 to 25 wt % redox-active molybdenum-containing ions; and
- 1 to 35 wt % a secondary ionic substance,
- wherein the gel electrolyte is substantially free of water, and
- wherein the gel electrolyte has a density of 1.4 to 1.9 $g/cm^3$ and an ionic conductivity of $2.3 \times 10^{-4}$ to $3.2 \times 10^{-4}$ $Scm^{-1}$.

* * * * *